(12) United States Patent
Gugel

(10) Patent No.: US 11,231,535 B2
(45) Date of Patent: *Jan. 25, 2022

(54) OPTICAL DEVICE HAVING AT LEAST ONE SPECTRALLY SELECTIVE COMPONENT

(71) Applicant: Leica Microsystems CMS GmbH, Wetzlar (DE)

(72) Inventor: Hilmar Gugel, Dossenheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 815 days.

This patent is subject to a terminal disclaimer.

(21) Appl. No.: 15/835,473

(22) Filed: Dec. 8, 2017

(65) Prior Publication Data

US 2018/0203172 A1   Jul. 19, 2018

Related U.S. Application Data

(60) Provisional application No. 62/432,038, filed on Dec. 9, 2016.

(51) Int. Cl.
*G02B 5/28* (2006.01)
*G02B 21/02* (2006.01)
*G02B 21/00* (2006.01)

(52) U.S. Cl.
CPC ......... *G02B 5/288* (2013.01); *G02B 21/0064* (2013.01); *G02B 21/0076* (2013.01); *G02B 21/02* (2013.01)

(58) Field of Classification Search
CPC .......... G02B 5/288; G02B 5/28; G02B 5/285; G02B 21/0064; G02B 21/0076;
(Continued)

(56) References Cited

U.S. PATENT DOCUMENTS 4,957,371 A * 9/1990 Pellicori ................ G01J 3/12
250/226
5,157,506 A * 10/1992 Hannah ............... G03B 27/735
356/404
(Continued)

FOREIGN PATENT DOCUMENTS

CN          104568873 A     4/2015
DE      102006034908 A1    1/2008
(Continued)

OTHER PUBLICATIONS

Yu et al., Development of a handheld spectrometer based on a linear variable filter and a complementary metal-oxide-semiconductor detector for measuring the internal quality of fruit, Jan. 19, 2016, Journal of Near Infrared Spectroscopy, 24, 69-76 (Year: 2016).*

*Primary Examiner* — Stephone B Allen
*Assistant Examiner* — Adam W Booher
(74) *Attorney, Agent, or Firm* — Leydig, Voit & Mayer, Ltd.

(57) ABSTRACT

An optical device includes an optical system and a spectrally selective component arranged in a beam path and configured to spectrally influence light that propagates along the beam path. The spectrally selective component comprises an effective surface having a spectral edge that varies with the incidence site of the light on the effective surface. The effective surface of the spectrally selective component is arranged in the beam path at a point at which a variation of the spectral edge, which is caused by a variation of the incidence angle at which the light is incident onto the effective surface, is at least partly compensated for by an opposite-direction variation of the spectral edge which is caused by a variation of the incidence site. Alternatively, the effective surface is arranged in the beam path at the site of an image of a pupil of the optical system.

23 Claims, 22 Drawing Sheets

(58) Field of Classification Search
CPC ...... G02B 21/02; G02B 21/002; G02B 21/36; G02B 21/361; G02B 21/364; G01J 3/12; G01J 2003/1234; G01J 2003/1226
USPC .......................................................... 356/419
See application file for complete search history.

(56) References Cited

U.S. PATENT DOCUMENTS

| | | | |
|---|---|---|---|
| 10,775,599 B2* | 9/2020 | Gugel | G02B 21/0064 |
| 2005/0017197 A1 | 1/2005 | Ulrich et al. | |
| 2006/0017001 A1* | 1/2006 | Donders | G02B 21/0076 |
| | | | 250/390.07 |
| 2008/0024782 A1 | 1/2008 | Wolleschensky et al. | |
| 2009/0161208 A1 | 6/2009 | Ralf et al. | |
| 2013/0235255 A1 | 9/2013 | Westpal et al. | |
| 2014/0125981 A1 | 5/2014 | Iga et al. | |
| 2015/0034810 A1 | 2/2015 | Iketaki | |
| 2016/0077167 A1* | 3/2016 | Heidmann | G01Q 70/14 |
| | | | 324/304 |
| 2016/0161729 A1* | 6/2016 | Honda | G02B 21/0076 |
| | | | 359/201.2 |
| 2017/0255105 A1* | 9/2017 | De Wit | G02B 21/365 |
| 2018/0321478 A1* | 11/2018 | Gugel | G02B 5/28 |

FOREIGN PATENT DOCUMENTS

| | | |
|---|---|---|
| DE | 102010045856 A1 | 3/2012 |
| DE | 102014008098 A1 | 12/2015 |
| JP | 2014095594 A | 5/2014 |
| JP | 5541978 B2 | 7/2014 |
| WO | WO 2016198694 A1 | 12/2016 |

* cited by examiner

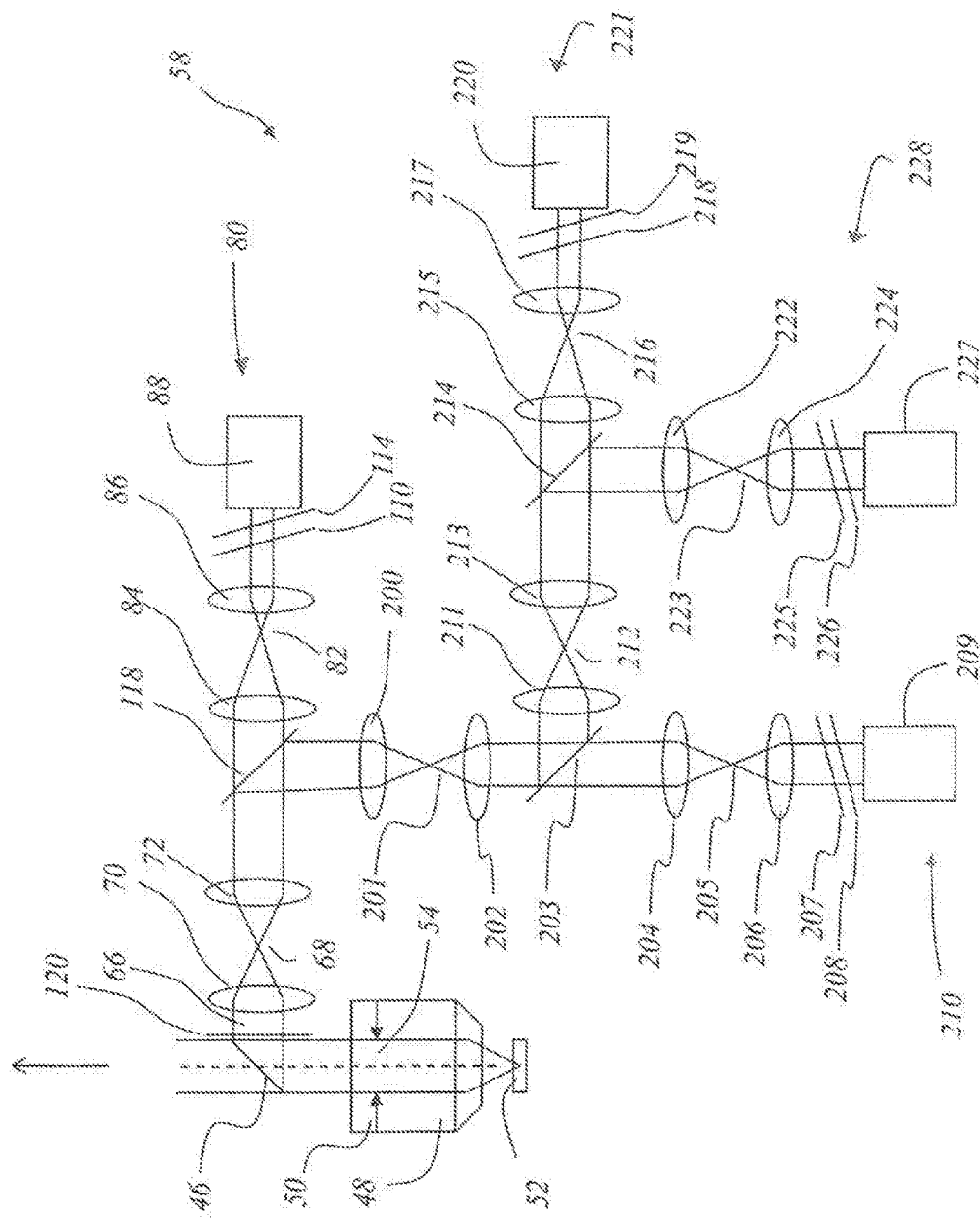

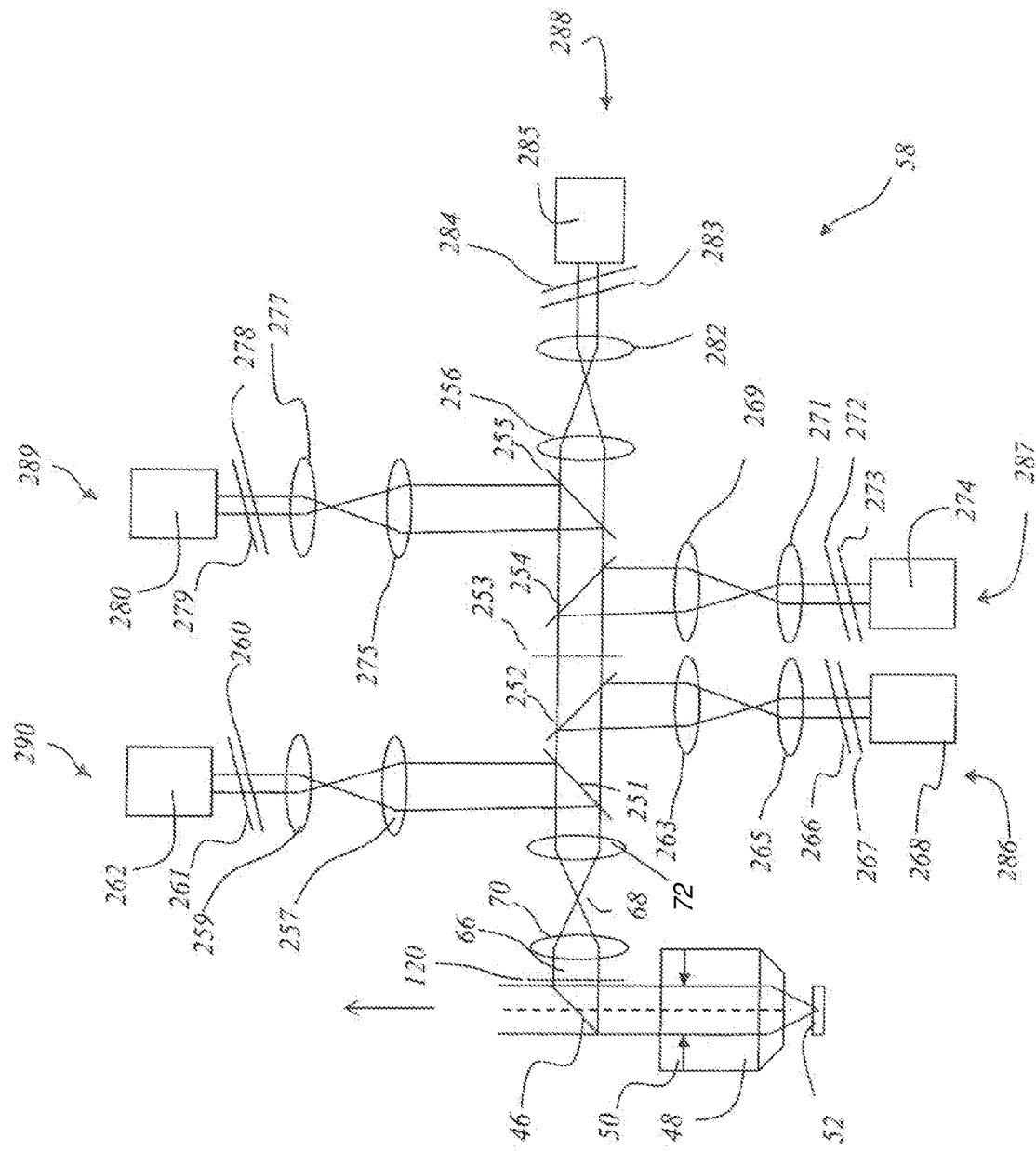

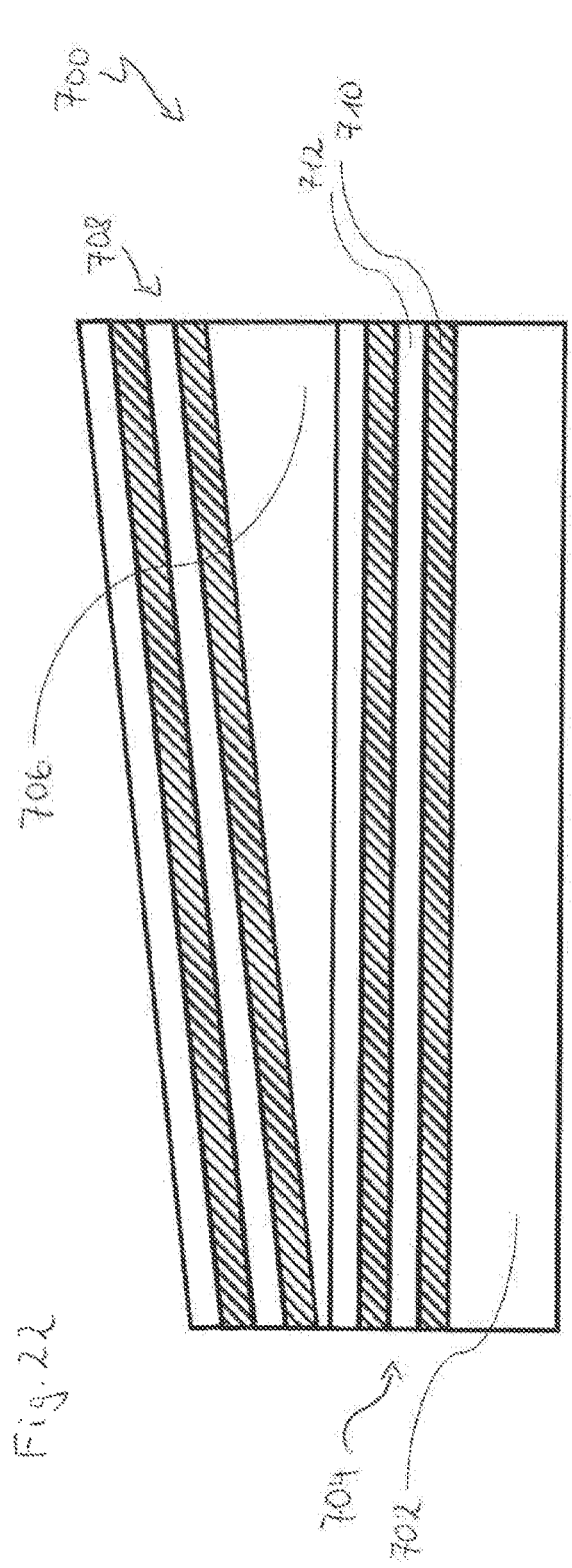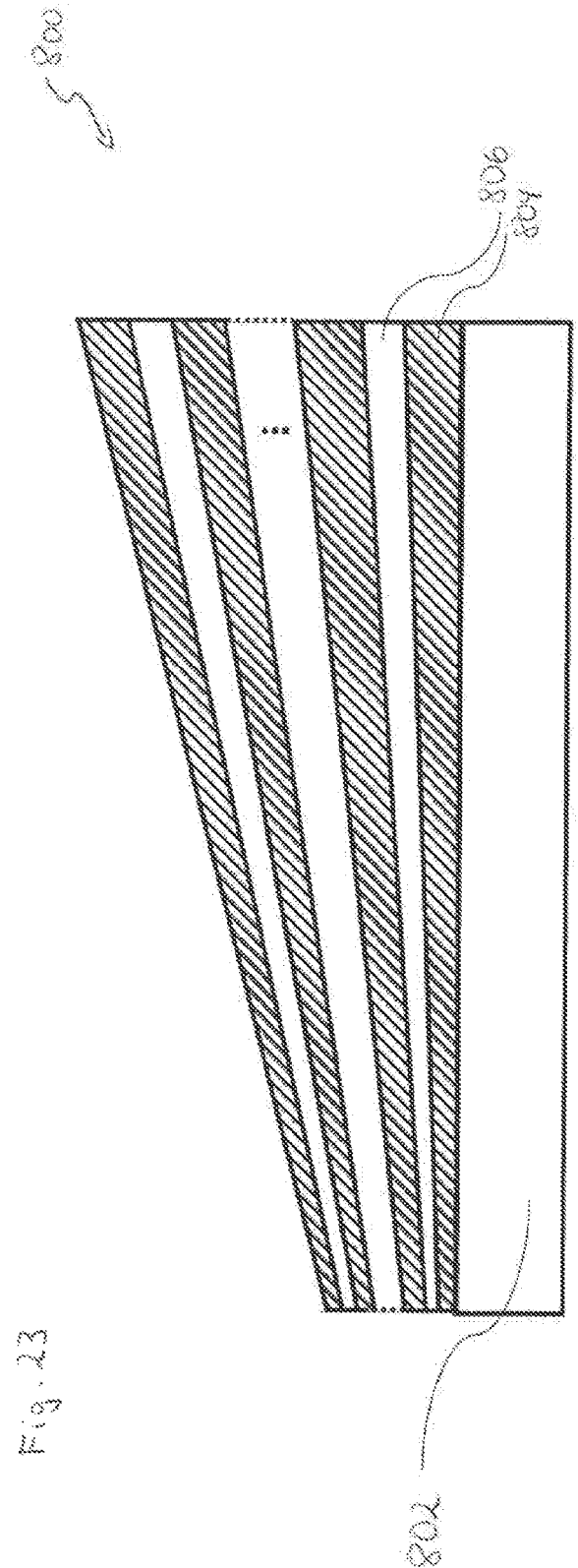

OPTICAL DEVICE HAVING AT LEAST ONE SPECTRALLY SELECTIVE COMPONENT

CROSS-REFERENCE TO PRIOR APPLICATION

Priority is claimed to U.S. Provisional Patent Application No. 62/432,038, filed on Dec. 9, 2016, the entire disclosure of which is hereby incorporated by reference herein.

FIELD

The invention relates to an optical device, in particular a microscope, having at least one spectrally selective component, arranged in a beam path, for spectrally influencing light that propagates along the beam path, the spectrally selective component comprising at least one effective surface having a spectral edge that varies with the incidence site of the light on the effective surface.

BACKGROUND

In many optical devices, dichroic beam splitters are used to divide or combine light and color filters are used to influence the spectral properties of the light. These components as a rule are configured so that the latter's spectral properties are established upon selection thereof for implementation of the device, i.e. can no longer be modified by the user during operation of the device. A certain flexibility in device operation can be achieved, for example, by the fact that various filters are arranged on a filter wheel or a filter slider, and one of those filters is switched to be active depending on the application. A stepless change in filter curves is not possible by means of such an arrangement, however, which is disadvantageous especially in light-microscopy applications.

In a number of microscopy applications, in particular in fluorescence microscopy, the sample to be investigated is illuminated with light of one or more different wavelengths or wavelength ranges, and the light proceeding from the sample is captured by means of at least one detector, for example an area detector such as a camera, a linear detector, or a spot detector. In this context, the light propagating in the beam path needs to be separated spectrally into different components. In incident light microscopy, for example, the sample is often illuminated through the objective, and the light proceeding from the sample is collected by the same objective. The illuminating and detected light are then usually respectively separated and combined with the aid of dichroic beam splitters that are designed for the different spectral properties of the illuminating and detected light. The detected light in the detection beam path is then split by dichroic beam splitters into different detected wavelength bands, and captured with different detectors. For better separation of the different wavelength bands it is possible to use in the detection beam path, in particular, dichroic band-pass filters that suppress light which lies outside the desired spectral region. Dichroic band-pass filters are also utilized in the illumination beam path, in this case for spectral limitation of the illuminating light directed onto the sample.

The dichroic beam splitters and band-pass filters used in particular in microscopy possess a permanently defined characteristic in terms of transmission and reflection. The beam splitters, each having a band-pass filter for excitation and detection, can be installed together in one component, e.g. a filter cube. Several filter cubes having different spectral properties can then be arranged, for example, on a selector wheel with which the user, while using the microscope, can pivot into the beam path the filter cube that is most suitable for the particular application. The spectral properties of such a filter cube are, however, unmodifiably defined. Spectral properties adapted to the respective application can be selected only in the context of the available filter cubes. The same applies to the filters and beam splitters that are located in the detection beam path in order to separate the different wavelength bands from one another or to suppress undesired wavelength bands.

DE 10 2006 034 908 A1 proposes using, in a scanning microscope, a spectrally selective component in the form of an edge filter whose limit wavelength, also referred to as a "spectral edge," varies along the filter. The spectral edge of a component of this kind, also referred to as a "gradient filter," separates a transmitted wavelength region from a wavelength region in which transmission does not occur.

The use of such an edge filter having a positionally variable spectral edge allows the user to adjust the spectral characteristic of the detector at will. Problems occur here, however, which are not addressed in DE 10 2006 034 908 A1. For example, a sufficiently steep spectral edge, i.e. a sufficiently sharp limit wavelength, can be achieved only if the detected light bundle incident onto the filter has a sufficiently small diameter. Any increase in bundle diameter inevitably results in a decrease in edge steepness. The less the edge steepness, the less precise the spectral characteristic of the detector.

The spectral edge location of the filter furthermore depends on the incidence angle at which the detected light bundle is incident onto the filter.

Regarding the existing art, reference is additionally made to the publication of Hamamatsu: "Image Splitting Optics, W-View GEMINI" Technical Note, June 2014.

SUMMARY

In an embodiment, the present invention provides an optical device which includes an optical system and at least one spectrally selective component arranged in a beam path and configured to spectrally influence light that propagates along the beam path. The spectrally selective component comprises an effective surface having at least one spectral edge that varies with the incidence site of the light on the effective surface. The effective surface of the spectrally selective component is arranged in the beam path at a point at which a variation of the spectral edge of the effective surface, which is caused by a variation of the incidence angle at which the light is incident onto the effective surface, is at least partly compensated for by an opposite-direction variation of the spectral edge of the effective surface which is caused by a variation of the incidence site at which the light is incident onto the effective surface. Alternatively, the effective surface is arranged in the beam path at the site of an image of a pupil of the optical system.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 20 shows the microscope according to the present invention in a further embodiment;

FIG. 21 shows the microscope according to the present invention in a further embodiment;

FIG. 22 shows an exemplifying embodiment of the spectrally selective component as a multi-layer Fabry-Perot filter; and FIG. 23 shows an exemplifying embodiment of the spectrally selective component as a multi-layer interference filter.

DETAILED DESCRIPTION

Figure 1:
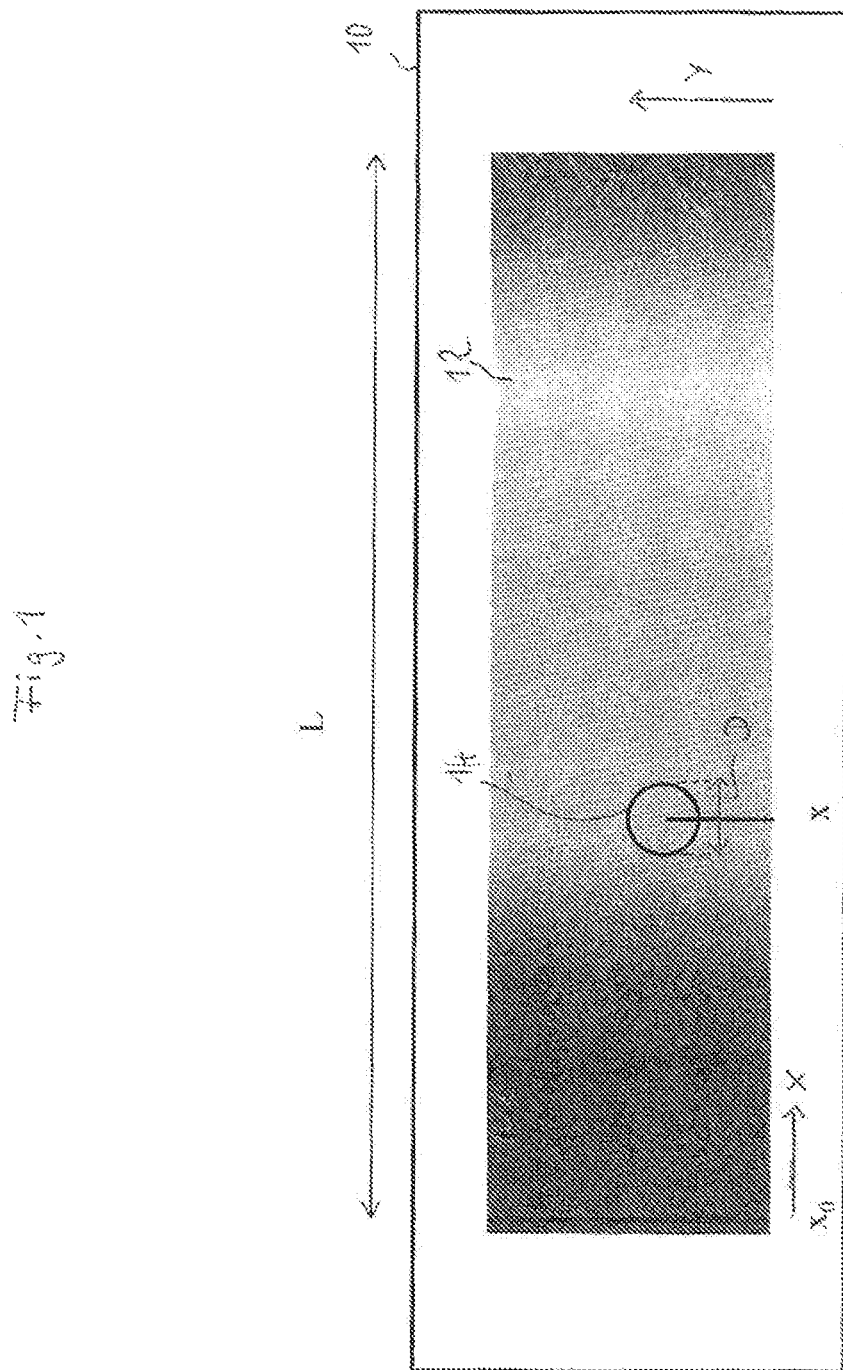
FIG. 1 schematically depicts a spectrally selective component according to the present invention.

Embodiments of the present invention provide an optical device, in particular a microscope, that allows the spectral properties of the device to be varied in simple fashion during operation of the device.

In a first embodiment, the invention provides an optical device that comprises an optical system and at least one spectrally selective component, arranged in a beam path, for spectrally influencing light that propagates along the beam path. The spectrally selective component comprises at least one effective surface having a spectral edge that varies with the incidence site of the light on the effective surface. The effective surface of the spectrally selective component is arranged in the beam path at a point at which a variation of the spectral edge of the effective surface, which is caused by a variation of the incidence angle at which the light is incident onto the effective surface, is at least partly compensated for by an opposite-direction variation of the spectral edge of the effective surface which is caused by a variation of the site at which the light is incident onto the effective surface. Alternatively, the effective surface of the spectrally selective component is arranged in the beam path at the site of an image of a pupil of the optical system.

In a second embodiment, the invention provides an optical device for wide field microscopy which comprises an objective and at least one spectrally selective component, arranged in a beam path, for spectrally influencing light that propagates along the beam path, the spectrally selective component comprising an effective surface having at least one spectral edge that varies with the incidence site of the light on the effective surface. The effective surface of the spectrally selective component is arranged in the beam path at a point at which a variation of the spectral edge of the effective surface, which is caused by a variation of the incidence angle at which the light is incident onto the effective surface, is at least partly compensated for by an opposite-direction variation of the spectral edge of the effective surface which is caused by a variation of the site at which the light is incident onto the effective surface. Alternatively, the effective surface of the spectrally selective component is arranged in the beam path at the site of an image of a pupil of the optical system.

The optical device in this context is a wide field microscope, preferably in the form of a fluorescence microscope, a bright field microscope, a light sheet microscope with or without oblique plane illumination, a wide field multiphoton microscope, a dark field microscope, a phase contrast microscope, or a differential interference contrast microscope.

The wide field microscope according to the present invention is not limited, however, to the embodiments recited above. It is instead intended to encompass any microscope in which, as in conventional light microscopy, the observed sample region is to be imaged in its entirety simultaneously. The wide field microscope can in that regard be distinguished from microscope arrangements that successively scan the sample region to be imaged, for example as in confocal microscopy.

In a third embodiment, the invention provides an optical device having an optical system and having at least one spectrally selective component, arranged in a beam path, for spectrally influencing light that propagates along the beam path for sample illumination, the spectrally selective component comprising at least one effective surface having a spectral edge that varies with the incidence site of the light on the effective surface. The effective surface of the spectrally selective component is arranged in the beam path at a point at which a variation of the spectral edge of the effective surface, which is caused by a variation of the incidence angle at which the light is incident onto the effective surface, is at least partly compensated for by an opposite-direction variation of the spectral edge of the effective surface which is caused by a variation of the site at which the light is incident onto the effective surface. Alternatively, the effective surface of the spectrally selective component is arranged in the beam path at the site of an image of a pupil of the optical system.

In a fourth embodiment of the invention, an optical device is provided, having an optical system and having at least one spectrally selective component, arranged in a beam path, for spectrally influencing light that propagates along the beam path, the spectrally selective component being made up of a multi-layer structure that defines an effective surface having at least one spectral edge that varies with the incidence site of the light on the effective surface. The effective surface of the spectrally selective component is arranged in the beam path at a point at which a variation of the spectral edge of the effective surface, which is caused by a variation of the incidence angle at which the light is incident onto the effective surface, is at least partly compensated for by an opposite-direction variation of the spectral edge of the effective surface which is caused by a variation of the site at which the light is incident onto the effective surface. Alternatively, the effective surface of the spectrally selective component is arranged in the beam path at the site of an image of a pupil of the optical system.

In this embodiment the spectrally selective component is configured, for example, as a multi-layer interference filter or as a Fabry-Perot filter.

In a fifth embodiment, the invention provides an optical device that comprises an optical system and at least one beam splitter for combining an illumination beam path and a detection beam path into one shared beam path in which the optical system is arranged, the beam splitter being a spectrally selective component for spectrally influencing light that propagates along the illumination beam path and along the detection beam path. The spectrally selective component comprises an effective surface having at least one spectral edge that varies with the incidence site of the light on the effective surface. The effective surface of the spectrally selective component is arranged in the shared beam path at a point at which a variation of the spectral edge of the effective surface, which is caused by a variation of the incidence angle at which the light is incident onto the effective surface, is at least partly compensated for by an opposite-direction variation of the spectral edge of the effective surface which is caused by a variation of the site at which the light is incident onto the effective surface. Alternatively, the effective surface of the spectrally selective component is arranged in the shared beam path at the site of an image of a pupil of the optical system.

In a sixth embodiment, the invention provides an optical device that comprises an optical system and at least one spectrally selective component, arranged in a beam path, for spectrally influencing light that propagates along the beam path, the beam path not being a non-descanned detection beam path of a microscope. The spectrally selective component comprises an effective surface having at least one spectral edge that varies with the incidence site of the light on the effective surface. The effective surface of the spectrally selective component is arranged in the beam path at a point at which a variation of the spectral edge of the effective surface, which is caused by a variation of the incidence angle at which the light is incident onto the effective surface, is at least partly compensated for by an opposite-direction variation of the spectral edge of the effective surface which is caused by a variation of the site at which the light is incident onto the effective surface. Alternatively, the effective surface of the spectrally selective component is arranged in the beam path at the site of an image of a pupil of the optical system.

The optical devices provided in accordance with the aforementioned embodiments of the invention are preferably each embodied as a microscope.

The optical system used in the respective optical device is furthermore preferably an imaging optic, in particular an objective.

The invention provides for two alternative positionings of the effective surface of the spectrally selective component in the beam path. In a first positioning the effective surface is located at a point at which a variation of the spectral edge of the effective surface, which is caused by a variation of the incidence angle at which the light is incident onto the effective surface, is at least partly compensated for by an opposite-direction variation of the spectral edge of the effective surface which is caused by a variation of the site at which the light is incident onto the effective surface. In a second positioning, the effective surface is arranged at the site of an image of a pupil of the optical system.

In the aforementioned first positioning, the variation of the incidence angle at which the light is incident onto the effective surface can be brought about, for example, by the fact that the light derives from different object points and is therefore assembled from different light bundles whose principal rays exhibit different inclinations relative to the optical axis of the beam path, and accordingly different incidence angles. This is the case, for example, when the optical device according to the present invention is used as a wide field microscope. The variation of the incidence angle at which the light is incident onto the effective surface can, however, also be caused, for example, by the fact that the light executes a scanning motion in the beam path and thereby continuously changes its incidence angle over time. This is the case, for example, in the detection beam path of a scanning microscope in which a so-called non-descanned detector is located, i.e. a detector that receives the detected light bundle that has not previously been directed back onto a scanning unit that deflects the illuminating light bundle so that it is guided in a scanning motion over the sample.

In the first positioning, the effective surface of the spectrally selective component is preferably arranged not perpendicularly but instead obliquely with respect to the optical axis of the beam path. The result of this oblique position is that, in contrast to a perpendicular orientation, the location of the spectral edge changes monotonically with incidence angle over the entire range of incidence angles. It is thereby possible to compensate for the incidence angle-dependent edge location shift by way of the likewise monotonically proceeding opposite-direction edge location shift which occurs as a result of the variation of the light incidence site on the effective surface of the spectrally selective component.

The aforementioned second positioning is profitably applicable in particular when the spectrally selective component is arranged with its effective surface perpendicular, or in any event almost perpendicular, to the optical axis of the beam path, and the maximum incidence angle (with reference to the perpendicular of the spectrally selective element) at which the light bundle is incident onto the effective surface of the component is not too large. In this case, arrangement of the effective surface at the site of the pupil image avoids a shift of the spectral edge due to a variation of the light incidence location on the effective surface, while the shift of the spectral edge brought about by a variation of the incidence angle is comparatively small and therefore tolerable. This is typically the case for incidence angles that are less than or equal to 35°, preferably less than or equal to 30°, and optimally less than or equal to 20°.

In the second positioning, in which the spectrally selective component is arranged in the pupil image or in any case in the immediate vicinity thereof, the principal rays of the light coming from the different object points strike at least approximately the same point on the effective surface, and are therefore also spectrally influenced in the same way by the effective surface. If the spectrally selective component is embodied, for example, as a filter, then in this case the principal rays of the light coming from the different object points experience the same filter function.

In the second positioning the spectrally selective component constitutes, for example, an edge filter, e.g. a short-pass filter, a long-pass filter, or a band-pass filter, where the band-pass filter can be made up of a short-pass filter and a long-pass filter that are arranged one behind another along the optical axis of the beam path.

The spectral edge, i.e. the limit wavelength between reflection and transmission, can be defined, for example, as the wavelength at which the transmittance is just equal to 50%. It is nevertheless self-evident that the spectral edge can also be defined in a different manner.

The effective surface of the spectrally selective component in the first positioning is preferably arranged in the beam path in such a way that its surface normal line is inclined at a predetermined angle with respect to the optical axis of the beam path; and that the effective surface is at a distance along the optical axis of the beam path, with respect to the site of the image of the pupil, which is predetermined as a function of the variation of the incidence angle of the light.

The aforesaid distance z is predetermined in such a way that preferably the following condition is met:

$$z \le -2 \cdot \frac{D_E}{D_L} \cdot \vartheta \cdot \frac{\sin(90° + \varphi_0 - \vartheta)}{\sin(\vartheta)}$$

in which $D_E$ designates an incidence dispersion that indicates the change in the spectral edge as a function of the incidence angle at which the light is incident onto the effective surface; $D_L$ designates a longitudinal dispersion that indicates the change in the spectral edge as a function of the site at which the light is incident onto the effective surface; $\vartheta$ indicates an angle between a principal ray of the light and the optical axis of the beam path at the site of the image of the pupil; and $\varphi_0$ indicates the predetermined angle at which the line normal to the effective surface is inclined with respect to the optical axis of the beam path. The expression above will be derived in detail later on.

The predetermined angle at which the line normal to the effective surface is inclined with respect to the optical axis of the beam path is, for example, less than or equal to 65°, preferably less than or equal to 45°, and in a very particularly preferred embodiment is less than or equal to 30°. The spectrally selective component is preferably arranged in the beam path in such a way that the reflection plane, i.e. the plane that is spanned by the incident beam and the reflected beam, is parallel to the direction in which the spectral edge of the effective surface varies.

Preferably the optical device according to the present invention comprises a drive system that is configured to displace the spectrally selective component in the beam path in such a way that the incidence site of the light on the effective surface is adjustable. The drive system is embodied, for example, as a mechanical, pneumatic, electrical, or piezoelectric drive system. For example, an electric motor can be used to adjust the desired position of the spectrally selective component. The adjustment can be made by the user him- or herself by means of corresponding software. It is also possible, however, to control the drive system in automated fashion.

Preferably the spectrally selective component is displaceable by means of the drive system along a variation axis along which the spectral edge of the effective surface varies.

For example, if the effective surface of the spectrally selective component is in the shape of a rectangle, the effective surface can then be displaced by means of the drive system along the variation axis proceeding parallel to the long side of the rectangle in order to adjust the desired spectral edge. On the other hand, if the spectrally selective component is embodied, for example, in such a way that the spectral edge of the effective surface changes along a circle, the effective surface can then be rotated by means of the drive system in order to establish the edge location.

It is also possible to embody the spectrally selective component shiftably along the beam path in order to enable flexible adaptation of the distance between the effective surface and the pupil image along the optical axis of the beam path. Such a shift can also be accomplished by means of a drive system of the kind recited above, preferably automatically. The respective drive system can be controlled on the basis of a fixed program sequence or by means of a regulating system that reacts to specific measured data such as light intensity or beam position. In this context it is possible in particular for the respective drive system to adapt the positioning associated with it before or even during measurement, for example in order to compensate dynamically for residual shifts in the edge location.

The beam path in which the at least one spectrally selective component is arranged is preferably made up of an illumination beam path or a detection beam path, or of a beam path segment shared by the illumination beam path and the detection beam path. In the latter embodiment the spectrally selective component serves, for example, to separate and/or combine the illumination and detection beam paths.

The at least one spectrally selective component preferably encompasses at least one beam splitter and/or at least one edge filter.

The at least one edge filter preferably encompasses at least one short-pass filter, at least one long-pass filter, and/or at least one band-pass filter.

A band-pass filter of this kind is preferably made up of a short-pass filter and a long-pass filter which are arranged one behind another along the optical axis of the beam path.

In order to make the configuration of the optical device more compact, it can be advantageous to arrange several spectrally selective components, having different filter regions or splitter regions, one behind another. For example, it is possible to provide a first substrate that comprises a first filter region or splitter region in which the spectral edge varies from a minimum value to a middle value. Furthermore, a second substrate can be provided which comprises a second filter region or splitter region within which the spectral edge varies from the aforesaid middle value to a maximum value. If the two aforesaid substrates are arranged, for example, one behind another in a detection beam path, they can then be used in such a way that that substrate which contains the desired spectral edge is introduced into the detection beam path, while the other substrate is removed from the beam path. In addition, these substrates can also comprise regions having a wavelength-independent high transmittance. This creates the possibility of leaving in the beam path the substrate that is presently to be made inactive, and simply introducing its region of wavelength-independent high transmittance into the beam path.

The optical device according to the present invention preferably encompasses at least a first and a second detection module, the beam splitter delivering the light, in spectrally separated fashion, by reflection to the first detection module and by transmission to the second detection module.

In this embodiment the detected light can be distributed variably to the two detection modules in particularly simple fashion.

A detector used in shared fashion by the two detection modules, which comprises two detector segments of which one captures the light reflected by the beam splitter and the other the light transmitted through the beam splitter, is preferably provided. A linear detector or an area or array detector, for example CCD, EMCCD, sCMOS, or QIS (quanta image sensor), is preferably usable as a detector utilized in shared fashion. The use of a single detector, one part of whose readout-capable sensor elements are associated with the one detector segment and the other part with the other detector segment, for two or even more than two detection modules is advantageous because on the hand high-quality detectors are expensive, and on the other hand the image fields being viewed are often sufficiently small that they can be captured using the respective detector segments of the shared detector.

Because large apertures occur in some cases in the beam path of the respective detection module, it is advantageous to use aspherical lenses in the detection module in order to minimize aberrations. It is particularly advantageous if these aspherical lenses are additionally of achromatic configuration.

The optical device preferably encompasses at least two beam splitters, one of which is arranged in the beam path in front of the image of the pupil and the other is arranged behind the image of the pupil. If the two beam splitters have the same longitudinal dispersion and the same incidence angle dispersion, they can then be arranged at the same distance in front of and behind the pupil image. This promotes a particularly simple and compact configuration.

In a further embodiment at least two beam splitters, which are arranged in front of the image of the pupil at different distances and exhibit different dispersions, and/or at least two beam splitters which are arranged behind the image of the pupil at different distances and exhibit different dispersions, are provided. This configuration is based on the recognition that the distance of the respective spectrally selective component from the pupil image depends, inter alia, on the dispersion of the component. This offers the possibility of arranging more than just one spectrally selective component both in front of and behind the pupil image, those components which are located on one side of the respective pupil having different dispersions.

As compared with conventional systems that usually operate with interference filters and in which the spectral properties are physically constant across the filters, the optical device according to the present invention offers the considerable advantage that by suitable adjustment of the spectrally selective components used in the device, the spectral properties of each individual detection channel can be defined by the user just before image acquisition. The greater the number of detection channels provided, the more evident this advantage becomes. In light of the above, the optical device comprises at least three detection modules, the at least two beam splitters constituting a beam splitter cascade whose first beam splitter delivers the light in spectrally separated fashion by transmission to a first detection module and by reflection to a second beam splitter of the beam splitter cascade, which then delivers the light reflected by the first beam splitter by transmission to the second of the aforesaid detection modules and by reflection, directly or indirectly via a further beam splitter, to a third of the aforesaid detection modules. This embodiment is based on the recognition that the spectrally selective components according to the present invention which constitute the aforementioned beam splitters have the property of possessing, proceeding from the spectral edge, a larger spectral region of high reflection than of high transmission. If an arrangement having more than two detection modules is then to be constituted, it is advantageous to implement cascading of the detection modules not via transmission but via reflection, in order to achieve the greatest possible spectral flexibility.

In a further advantageous embodiment, the aforementioned beam splitters are embodied in such a way that the wavelengths of the spectral components of the detected light bundle that the beam splitters deliver by transmission to the detection modules respectively associated with them decrease successively within the beam splitter cascade. In the context of an arrangement comprising several detection modules, for example, each individual detection module can thus detect, at maximum, that portion of the detected light which is not detected by the other detection modules. In this embodiment provision is therefore made to divert out of the detected light onto the first detection module in the detection beam path, i.e. onto the detection module that is arranged behind the first beam splitter in transmission, the spectral component that has the longest light wavelengths. That spectral component of the detected light whose light wavelengths are the second-longest are correspondingly directed onto the second detection module within the detection beam path, i.e. onto the detection module that is arranged behind the second beam splitter in transmission. The further spectral components are then distributed analogously onto the remaining detection modules. The beam splitters are consequently embodied as long-pass beam splitters.

What results, in interaction with the embodiment described previously, is therefore a cascading of the detection modules not only via reflection at the beam splitters but also via the wavelengths of the spectral components of the detected light which are detected with the detection modules.

Because the reflectance of the beam splitters is usually higher than their transmittance, the beam splitter cascade offers the advantage of a higher light yield because the detected light, on its path to the respective detection modules, is transmitted in each case only at exactly one of the beam splitters.

A beam splitter cascade of the kind described above can also be provided, in a corresponding configuration, in an illumination beam path of the optical device.

Referring to FIG. 1, firstly an explanation will be given below of the properties of a spectrally selective component 10 that is used according to the present invention in an optical device, in particular in a microscope, to spectrally influence the illuminating light and/or the detected light.

In the exemplifying embodiment according to FIG. 1, spectrally selective component 10 is a variable edge filter, e.g. a long-pass filter or a short-pass filter. As a long-pass filter, the edge filter transmits only the spectrum above a predetermined limit wavelength or spectral edge, while as a short-pass filter it transmits the spectrum only below the limit wavelength. It is to be noted, however, that the explanations below are not limited to a filter, but are also correspondingly valid for the case in which component 10 according to the present invention constitutes a spectrally selective beam splitter that transmits the spectrum above the spectral edge, while it reflects the spectrum below the spectral edge in defined fashion (or vice versa).

In the exemplifying embodiment according to FIG. 1, spectrally selective component 10 has an effective surface 12 that has a spectrally effective length L along a variation axis V. In FIG. 1, variation axis V is located parallel to a longitudinal direction labeled x and perpendicular to a width direction labeled y.

Component 10 has the property that its spectral edge changes with the location of the incidence of the light along variation axis V. Variation axis is therefore also referred to as a "dispersion axis."

As presented below in detail, the change in the spectral edge with the incidence site of the light along variation axis V can occur linearly or nonlinearly, e.g. quadratically, exponentially, or in another manner. In contrast, in the exemplifying embodiment according to FIG. 1 the spectral properties of edge filter 10, in particular its spectral edge, are largely constant in width direction y perpendicular to variation axis V. The light spot generated by the light on effective surface 12 of edge filter 10 is labeled 14 in FIG. 1.

For the explanations that follow, it is assumed that the spectral edge, i.e. the limit wavelength between transmission and non-transmission or reflection, is defined as that wavelength at which transmission is just equal to 50%. The change in the spectral edge around the site of light incidence along direction x (see FIG. 1), i.e. along variation axis V, can be described mathematically with the derivative $$\left.\frac{\partial \lambda_{edge}(x, \theta)}{\partial x}\right|_{x_0,\theta_0}$$

where $\theta$ designates the incidence angle of the principal ray of the light with respect to a normal line proceeding perpendicularly to effective surface 12. This derivative identifies the longitudinal dispersion $D_L$. In addition, the variable $x_0$ designates a reference position in the x direction (see FIG. 1), and $\theta_0$ a design incidence angle for which spectrally selective component 10 is designed. If the longitudinal dispersion $D_L$ is constant or almost constant, the spectral edge then changes linearly. In this case spectrally selective component 10 is a linearly variable beam splitter or a linearly variable filter.

The change in the spectral edge as a function of the incidence angle at which the light is incident onto effective surface 12 is described mathematically by the derivative $$\left.\frac{\partial \lambda_{edge}(x, \theta)}{\partial \theta}\right|_{x_0,\theta_0}$$

This derivative describes the incidence angle dispersion $D_e$.

If spectrally selective component 10 according to FIG. 1 is then used, for example, as a beam splitter or as a filter in an optical device, in particular in a microscope, it is to be noted that depending on the application, a variation can occur in the incidence angle at which the light is incident onto effective surface 12 of spectrally selective component 10. In a wide field microscope, for example, the principal rays of the light bundles coming from the different object points as a rule pass through different regions on effective surface 12 of spectrally selective component 10 for different field angles. The light correspondingly also experiences different filtering as a function of the incidence angle. In other words, effective surface 12 of spectrally selective component 10 exhibits a filter function that varies depending on the incidence angle or field angle.

The problem explained above also occurs when the incidence angle of the light onto effective surface 12 of spectrally selective component 10 varies not as a consequence of a differing field angle, but as a consequence of a scanning motion of the light, as occurs e.g. in the illumination beam path or detection beam path of a scanning microscope. This problem is avoided if spectrally selective component 10 is arranged at the site of an image of a pupil possessed by an objective of the optical device. This is because at the site of a pupil image, the main beams of the various light bundles that proceed from different object points meet at the optical axis of the beam path. A "principal ray" here refers to the beam that proceeds from an off-axis point and intersects the optical axis in the plane of the entrance pupil (optionally along an extension), in the plane of the aperture diaphragm, and in the plane of the exit pupil (optionally along an extension). All other beams that proceed from the object point in question and pass through the optical system arrange themselves around this principal or "symmetry" ray. Thanks to this arrangement, referred to above as a "first positioning," of spectrally selective component 10, the light experiences an almost identical filter function by way of spectrally selective component 10 for all object points. The same is true in a case in which the variation in incidence angle is caused by a scanning motion of the light.

A further problem then results from the fact that in terms of the desired spectral properties of component 10, the beam diameter of the light that is incident onto effective surface 12 cannot be ignored. This is illustrated in the depiction of FIG. 1 by way of diameter D of light spot 14. The diameter of the exit pupil of a microscope objective, and thus also the beam diameter of the light incident onto effective surface 12, is typically in a range from 10 mm to 20 mm. Purely by way of example, in a typical edge wavelength range from 400 nm to 800 nm this beam diameter correlates with a longitudinal dispersion $D_L$ of spectrally selective component 10 which is equal to approximately 10 nm/mm so that the length of component L does not become excessive. For a beam diameter in the range from 10 mm to 20 mm, the filter function of spectrally selective component 10 is then averaged over an edge wavelength region whose width is between 100 nm and 200 nm. This results in "blurring" of the edge wavelength over that region.

This problem can be avoided by reducing the beam diameter of the light. It must be pointed out, however, that such a reduction in the beam diameter results in an increase, to the same degree, in the incidence angle that occurs. For example, the principal rays emerging from a microscope objective have a typical angle range of ±2° based on the desired image fields. Reducing the beam diameter by a factor of 10, for example, i.e. to a range from 1 to 2 mm, would cause the aforesaid angle range to increase to ±20°. As indicated in equation (8) derived below, this would result in a considerable variation in edge wavelength in the angle range, and thus extend over the image.

The solution according to the present invention so as to avoid the problem explained above is on the one hand to reduce the beam diameter of the light incident onto spectrally selective component 10 to a degree that is acceptable in terms of blurring of the spectral edge, and on the other hand to arrange spectrally selective component 10 in the beam path at a point at which the edge wavelength shift as a consequence of a variation of the light incidence location on effective surface 12 just corresponds to the opposite-direction edge wavelength shift that is caused by a change in the incidence angle. This arrangement of spectrally selective component 10, referred to above as a "first positioning" according to the present invention, will be explained below with reference to FIG. 2.

Figure 2:
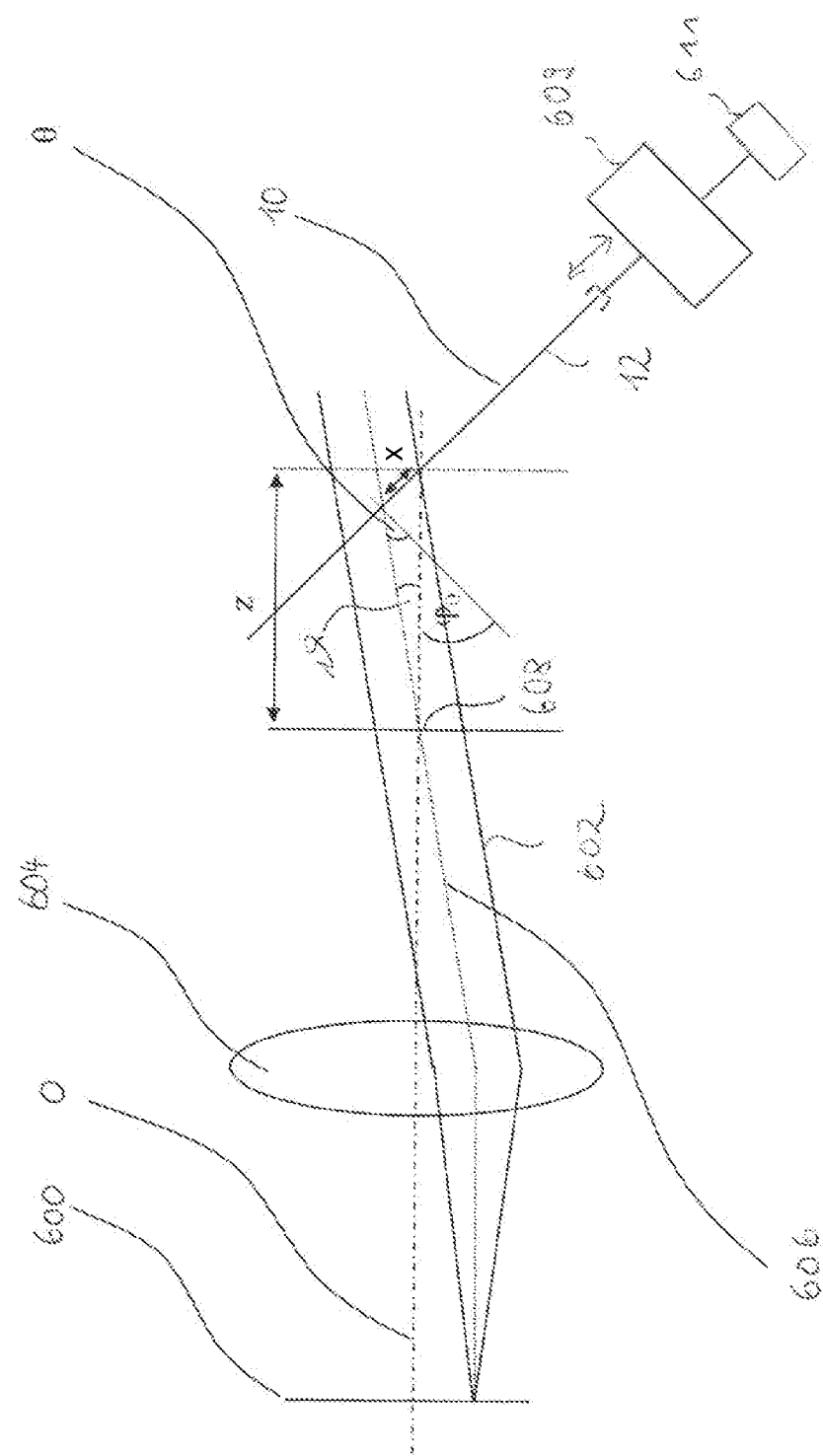
FIG. 2 is a schematic depiction illustrating the first positioning according to the present invention of the spectrally selective component.

Firstly, it should be noted that the depiction in FIG. 2 is highly simplified, and serves merely to illustrate the first positioning according to the present invention of spectrally selective component 10.

FIG. 2 shows a parallel light bundle 602, coming from object 600, which is directed through a lens arrangement 604 onto effective surface 12 of spectrally selective component 10. Light bundle 602 is deflected by lens arrangement 604 in such a way that the principal ray (labeled 606 in FIG. 2) of light bundle 602 is inclined at an angle $\vartheta$ with respect to optical axis O of the beam path. Principal ray 606 of light bundle 602 intersects optical axis O at the site of a pupil image that is labeled 608 in FIG. 2. The distance between effective surface 12 along optical axis O and the site of pupil image 608 is labeled z in FIG. 2. Effective surface 12 is inclined with respect to optical axis O in such a way that its surface normal line is at an angle $\varphi_0$ with respect to optical axis O. Also shown in FIG. 2 are an angle $\Theta$ that principal ray 606 and the line normal to effective surface 12 enclose between them, and a distance x, measured along variation axis V (see FIG. 1), between principal ray 606 incident onto effective surface 12 and a point at which optical axis O intersects effective surface 12.

It should be noted at this point that the depiction in FIG. 2 is highly simplified. It is to be assumed that the optical system in question is assembled from sub-systems that in turn have entrance pupils and exit pupils. In the case of a microscope, the "pupil" refers to the exit pupil of the objective.

Because the parallel light bundle 602 is incident onto effective surface 12 at the incidence angle $\Theta$, principal ray 606 of light bundle 602 strikes effective surface 12 at a distance x from optical axis O. For the positioning according to the present invention, it should be the case that the incidence angle $\Theta$ is less than or equal to the angle $\varphi_0$. A further prerequisite is that the distance z is greater than 0.

With the prerequisites recited above, the distance x is calculated as follows:

$$x = z \frac{\sin(\varphi_0 - \theta)}{\sin(90° + \theta)} \quad (1)$$

Principal ray 606 of light bundle 602 strikes, at a varying incidence angle $\Theta$, different points on effective surface 12 of spectrally selective component 10. Light bundle 602 thus experiences filtering with an edge wavelength that varies with the incidence angle. This effect is compensated for according to the present invention, however, by the fact that the edge wavelength shift corresponds, as a consequence of a variation of the light incidence site on effective surface 12, to the opposite-direction edge wavelength shift that is caused by the change in the incidence angle $\Theta$. This can be described mathematically by the following equation:

$$x \cdot D_L = -(\varphi_0 - \theta) \cdot D_E \quad (2)$$

It should be the case here that $\varphi_0 = \theta_0$, since effective surface 12 of spectrally selective component 10 is arranged at the angle to optical axis O for which it is designed.

The angle $\vartheta$ of principal ray 606 with respect to optical axis O at the location of pupil image 608 is calculated as follows:

$$\vartheta = \varphi_0 - \theta \quad (3)$$

Using equation (3), equation (1) can be rewritten as:

$$x = z \frac{\sin(\vartheta)}{\sin(90° + \varphi_0 - \vartheta)} \quad (4)$$

From equations (2), (3), and (4) it follows that:

$$z = -\frac{D_E}{D_L} \cdot \vartheta \cdot \frac{\sin(90° + \varphi_0 - \vartheta)}{\sin(\vartheta)} \quad (5)$$

There also exists a principal ray having the angle $\vartheta_0$ which meets the following condition:

$$z = -\frac{D_E}{D_L} \cdot \vartheta_0 \cdot \frac{\sin(90° + \varphi_0 - \vartheta_0)}{\sin(\vartheta_0)} \quad (6)$$

The incidence angle dispersion $D_E$ and longitudinal dispersion $D_L$ have different signs. The angle $\vartheta_0$ is therefore the angle of a principal ray at which a shift of the edge location due to the variation of the incidence site is compensated for by the incidence angle-dependent edge location shift, and at the same time the deviations from the desired compensation are minimal over the entire angular range of the principal rays.

At least the following condition should exist for the angle $\vartheta \neq 0$ of all the principal rays:

$$z \leq -2 \cdot \frac{D_E}{D_L} \cdot \vartheta \cdot \frac{\sin(90° + \varphi_0 - \vartheta)}{\sin(\vartheta)} \quad (7)$$

Approximations for the incidence angle dispersion $D_E$ and for equation (4) will be derived below (cf. equations (9) and (10) below). These approximations are directed toward concrete exemplifying embodiments, but other approximations that lead to different technical realizations of the solution according to the present invention are also possible. The aim in all cases is for a shift of the edge location due to the variation of the incidence site to be compensated for by the incidence angle-dependent edge location shift, and at the same time for the deviations of the compensation to be globally minimal over the entire angular range of the principal rays.

The change in the spectral edge with incidence angle in interference filters that are configured for perpendicular light incidence can be described by the following equation (Warren J. Smith: Modern Optical Engineering, third edition, McGraw-Hill, 2000, page 208):

$$\lambda_{edge}(\theta) = \lambda_{edge}(\theta_0) \sqrt{1 - \frac{\sin^2(\theta)}{n^2}} \quad (8)$$

where $\theta_0$ designates the incidence angle for which the filter is designed, and n is an effective refractive index. Although equation (8) is valid, strictly speaking, only for angles in the vicinity of $\theta_0 = 0°$, it can also be used approximately for incidence angles that lie within an angular range around an incidence angle $\theta_0 > 0°$, e.g. in an angular range around $\theta_0 = 45°$. The derivative of equation (8):

$$\left.\frac{\partial \lambda_{edge}(\theta)}{\partial \theta}\right|_{\theta_0} = a \cdot \lambda_{edge}(\theta_0) \quad (9)$$

with the constant $$a = \frac{-\sin(\theta_0)\cos(\theta_0)}{n^2\sqrt{1 - \frac{\sin^2(\theta_0)}{n}}},$$

describes the change in edge wavelength with the incidence angle of the light onto the interference filter in general, and only spectrally selective component 10 according to the present invention in particular.

Equation (1) can be approximated by a linear adaptation function using a constant k, for example by means of a Taylor expansion, as follows:

$$x = z \cdot k \cdot (\varphi_0 - \theta) \quad (10)$$

Equation (2), with equations (9) and (10), then yields:

$$\left.\frac{\partial \lambda_{edge}(x, \theta_0)}{\partial x}\right|_{x_0} = -\left.\frac{\alpha \cdot \lambda_{edge}(x, \theta_0)}{z \cdot k}\right|_{x_0} \quad (11)$$

One solution of equation (11) is represented by the following expression:

$$\lambda_{edge}(x, \theta_0) = \lambda_0 \cdot \exp\left(\frac{-a}{z \cdot k} \cdot x\right) \quad (12)$$

where $\lambda_0$ describes the starting wavelength, i.e. the wavelength at the zero point of the x coordinate.

Equation (12) represents a concrete technical implementation in which the spectral edge varies exponentially along variation axis V, i.e. in the x direction (see FIG. 1). Other implementations are, however, also conceivable, for example with a linear or quadratic profile, or one varying in another manner, for the spectral edge.

As shown in FIG. 2, a drive apparatus 609 is provided with which spectrally selective component 10 can be shifted in an x direction in order to establish as desired the site at which the light is incident onto effective surface 12, and thus the site-dependent spectral characteristic. Drive apparatus 609 is controlled by means of a control unit 611. Drive apparatus 609 can additionally be embodied in such a way that it enables a displacement of spectrally selective component 10 in a z direction, i.e. along the optical axis.

Figure 3:
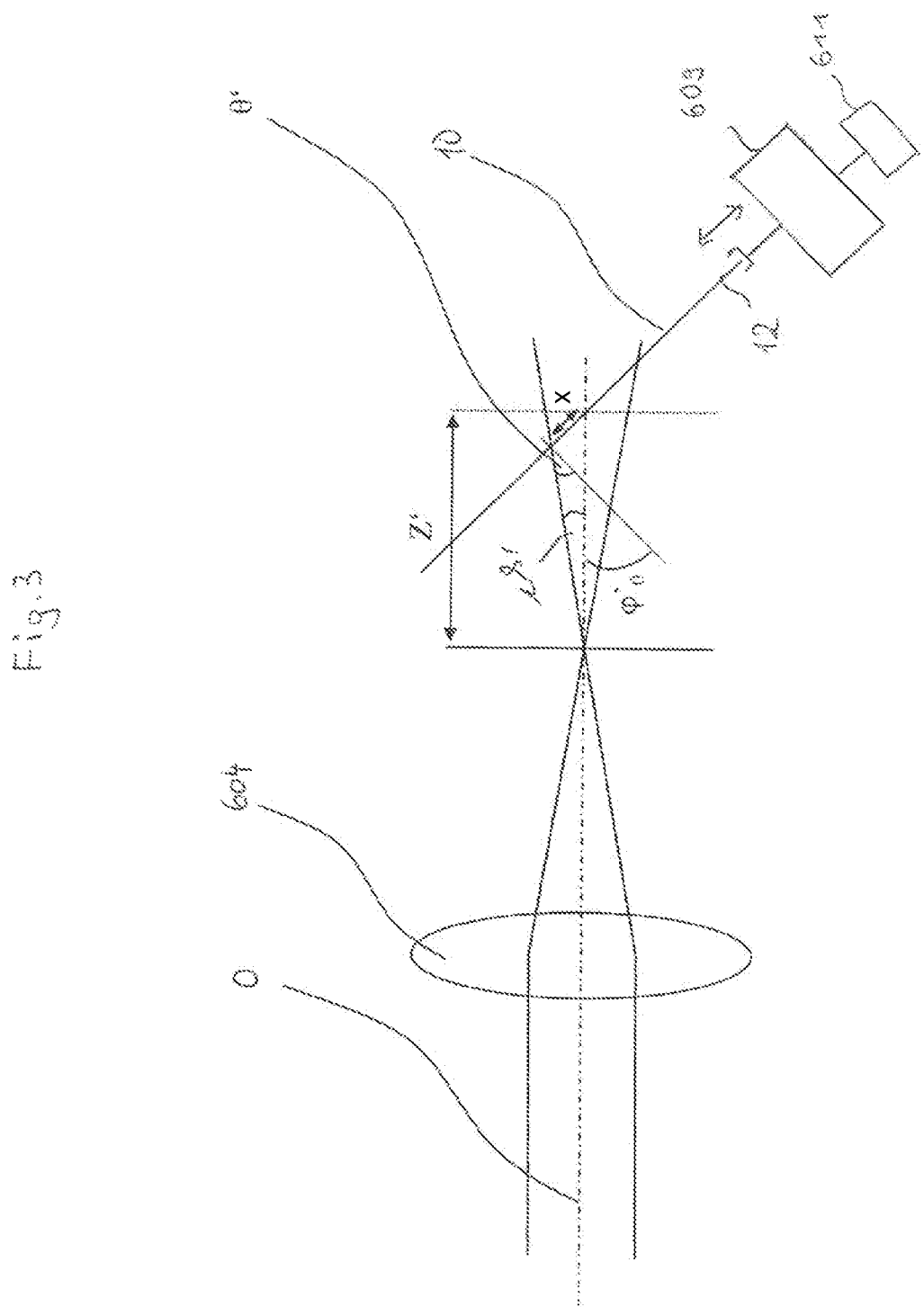
FIG. 3 is a schematic depiction illustrating the first positioning according to the present invention of the spectrally selective component, in a modified form.

In addition to the capability of arranging spectrally selective component 10 at a distance z from pupil image 608 in order to compensate for a shift in the edge location as a consequence of the variation in light incidence site due to the incidence angle-dependent edge location shift, the desired compensation can also be achieved by the fact that spectrally selective component 10 is positioned, as depicted in FIG. 3, at a distance z' with respect to an object image 608 or to a plane conjugated therewith (or also to the object itself). The distance z' is calculated in accordance with calculation of the distance z shown in FIG. 2. In FIG. 3, the angle $\varphi'_0$ designates the angle between optical axis O and the line normal to effective surface 12. The angle $\theta'$ designates the incidence angle of the corresponding ray with respect to the line normal to effective surface 12. The angle $\vartheta' = \varphi'_0 - \theta'$ indicates the angle enclosed by the beam and optical axis O.

The arrangement according to FIG. 3 results in very good compensation for individual object points or image points. Almost no blurring occurs over the edge width. A variation does occur, however, in the spectral properties over the image field, and it increases as the image field becomes larger. The arrangement according to FIG. 3 is therefore advantageous in particular for small image fields.

A variety of embodiments of optical devices according to the present invention, each containing one or more spectrally selective components of the kind depicted in FIG. 1, will be described below. The spectrally selective components are each arranged either in an oblique position with respect to the optical axis of the pertinent beam path according to FIGS. 2 and 3, at a distance z from a pupil image or at a distance z' from an object image, or they are arranged in an orthogonal or almost orthogonal orientation with respect to the optical axis at the site of a pupil image or at least in the immediate vicinity thereof.

Figure 4:
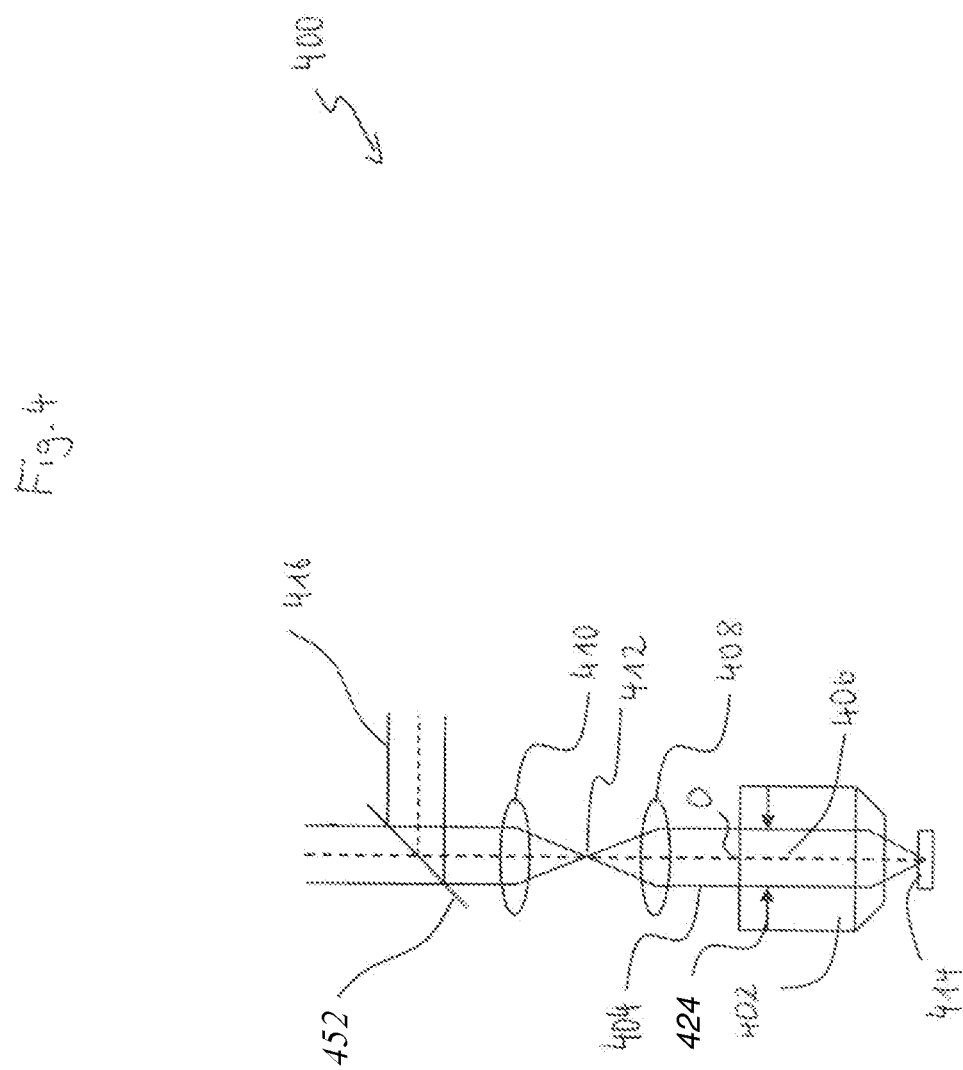
FIG. 4 shows a microscope according to the present invention as an exemplifying embodiment.

FIG. 4 schematically depicts a microscope 400 that represents an exemplifying embodiment of the optical device according to the present invention. Microscope 400 comprises an objective 402 that is located in a beam path 404. Light 406 propagating in beam path 404 passes through a lens arrangement made up of two lenses 408 and 410, between which an image 412 of a sample 414 is generated.

Microscope 400 furthermore contains a spectrally selective component according to the present invention in the form of a beam splitter 452. Beam splitter 452 is arranged with its effective surface at an angle of 45° with respect to optical axis O of beam path 404. The function of beam splitter 452 is to deflect a first spectral component of light 406 into a sub-beam path 416 branched off from beam path 404. A second spectral component of light 406, different from the first spectral component, is transmitted through beam splitter 452.

Figure 5:
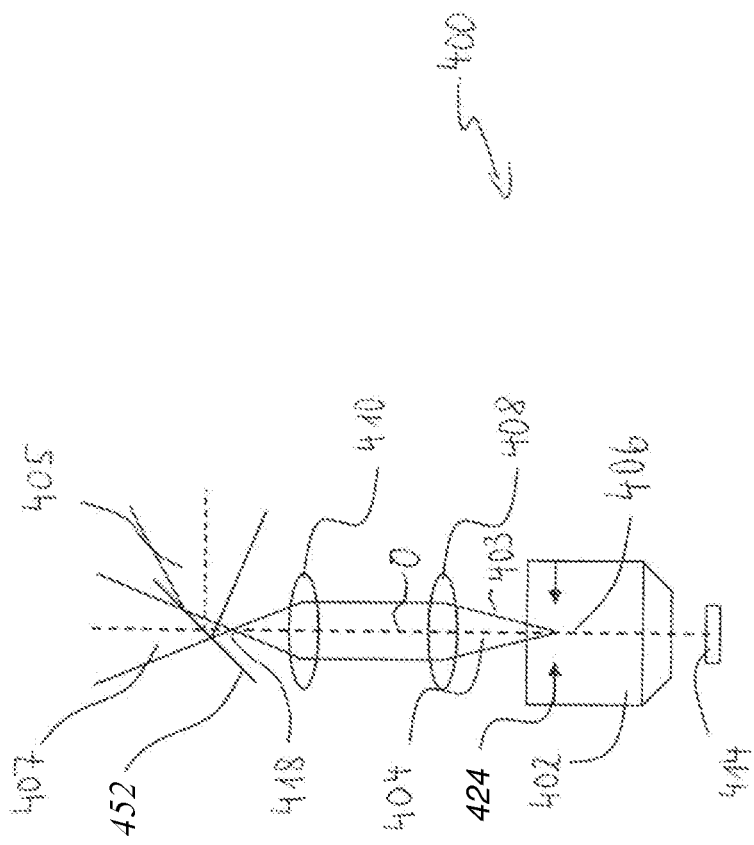
FIG. 5 shows the pupil imaging beam path for the embodiment shown in FIG. 4.

FIG. 5 shows the pupil imaging beam path that is pertinent to the arrangement according to FIG. 4. As depicted in FIG. 5, beam splitter 452 is arranged in beam path 404 in such a way that it is at a distance from an image 418 of a pupil 420 of objective 402. The distance from pupil image 418 is preferably established in accordance with equation (7). The pupil imaging rays are labeled 403, 405, and 407 in FIG. 5.

In the arrangement according to FIGS. 4 and 5, spectrally selective component 452 has the function of a beam splitter, which spectrally divides the detected light deriving from sample 414. In the arrangement shown, however, it is also possible to use spectrally selective component 452 as a beam combiner, which brings together illuminating light of different spectral compositions, which is emitted from two separate light sources, in beam path 404 by reflection and transmission.

Figure 6:
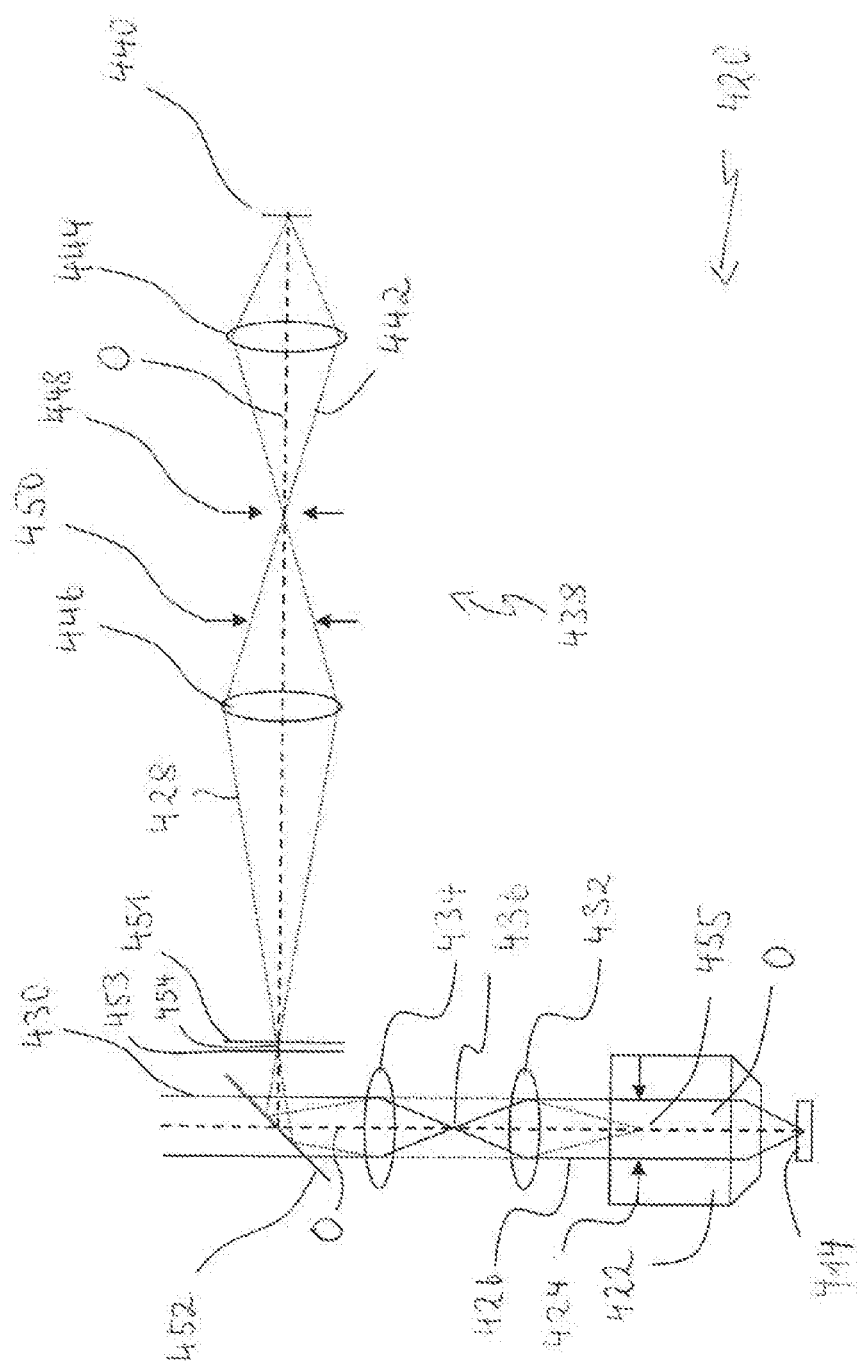
FIG. 6 shows a microscope according to the present invention in a further embodiment.

FIG. 6 shows a microscope 420 as a further exemplifying embodiment. Microscope 420 comprises an objective 422 having a pupil 424. Objective 422 is arranged in a beam path 426 in which an illumination beam path 428 and a detection beam path 430 are brought together. Located in beam path 426 that is used in shared fashion for illumination and detection is a lens arrangement that is made up of two lenses 432 and 434. An intermediate image 436 of sample 414 is generated between the two lenses 432 and 434.

Microscope 420 encompasses an illumination unit 438 having a light source 440 that emits illuminating light 442. Also located in illumination beam path 428 of illumination unit 438 is a lens arrangement that is made up of two lenses 444 and 446. An aperture diaphragm 448 and a field diaphragm 450 are arranged between the two lenses 444 and 446. Illumination unit 438 furthermore comprises two spectrally selective components in the form of a long-pass filter 451 and a short-pass filter 453 which together form a band-pass filter. This band-pass filter serves, for example, to establish a wavelength region in which sample 414 is excited to fluoresce in the desired manner. Long-pass filter 451 and short-pass filter 453 are arranged orthogonally to optical axis O of illumination beam path 428.

Microscope 420 also has a further spectrally selective component according to the present invention in the form of a beam splitter 452. Beam splitter 452 serves to couple the illuminating light emitted from light source 440 into the shared beam path 426 by reflection. Beam splitter 452 further serves to couple detected light deriving from sample 414 into detection beam path 430 by transmission.

The arrangement shown in FIG. 6 consequently comprises three spectrally selective components which are provided as long-pass filter 448, short-pass filter 450, and beam splitter 452. The two filters 448, 450 oriented orthogonally to the optical axis of illumination beam path 428 are located approximately at the site of an image 454 of light source 440. Beam splitter 452 set obliquely with respect to optical axis O, on the other hand, is once again arranged at a distance from the image of objective pupil 424 which is preferably calculated according to equation (7).

The arrangement according to FIG. 6 allows implementation of an "incident" illumination in which light source 440 is imaged into pupil 424 of objective 422, as indicated in FIG. 6 by the reference character 455. Beam splitter 452 is thus located at a distance s' from the image of light source 440 and at a distance s from the conjugate of objective pupil 424. Instead of being arranged at a distance s from the conjugate of objective pupil 424, beam splitter 452 could also be arranged at a distance s from objective pupil 424 itself. The positioning recited above relative to the conjugate of objective pupil 424 has advantages, however. For example, objective pupil 424 on the one hand is often located inside objective 422 or at least very close to the shoulder of objective 422, thereby making it difficult to arrange beam splitter 452 in the immediate vicinity of objective 422. On the other hand, an additional image of objective pupil 424 makes it possible to adapt the image scales, so that the image of light source 440 close to beam splitter 452 and in objective pupil 424 can be of different sizes, i.e. can be selected in adapted fashion.

In the arrangement according to FIG. 6, further spectrally selective components, which are embodied e.g. as long-pass filters or short-pass filters, can also be introduced into the respective beam paths. Further filtering of the light can therefore be useful, in particular for better spectral separation of excitation light and detected light.

Figure 7:
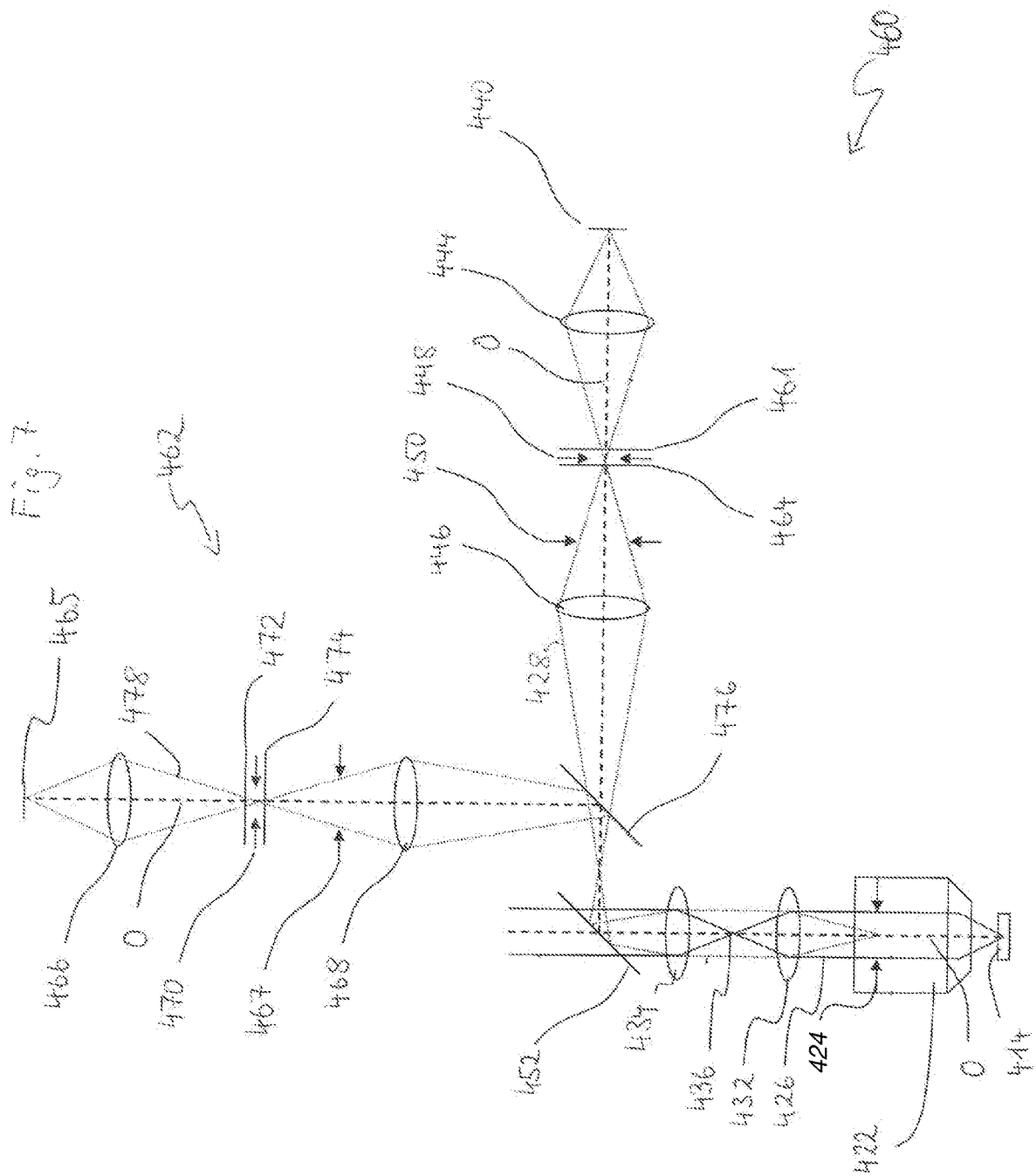
FIG. 7 shows a microscope according to the present invention in a further embodiment.

FIG. 7 shows a microscope 460 that refers to the embodiment depicted in FIG. 6. As compared with the latter embodiment, microscope 460 according to FIG. 7 comprises an additional illumination unit 462. In addition, in microscope 460 a short-pass filter 461 and a long-pass filter 464, which correspond respectively to the two filters 448 and 450 of the arrangement according to FIG. 6, are present at the location of aperture diaphragm.

Additional illumination unit 462 comprises a light source 465 and a lens arrangement made up of two lenses 466 and 468. An aperture diaphragm 470 is located between the two lenses 466 and 468. Two spectrally selective components, in the form of a short-pass filter 472 and a long-pass filter 474, are arranged at the location of aperture diaphragm 470. Additional illumination unit 462 furthermore comprises a field diaphragm 467.

Microscope 460 has a further spectrally selective component in the form of a beam splitter 476. Beam splitter 476 couples illuminating light 478 emitted from light source 465 of illuminating unit 462, by reflection, into illumination beam path 428 of illumination unit 438. Illuminating light 478 reflected at beam splitter 476 is then once again coupled at beam splitter 452 into the beam path used in shared fashion for illumination and detection.

Figure 8:
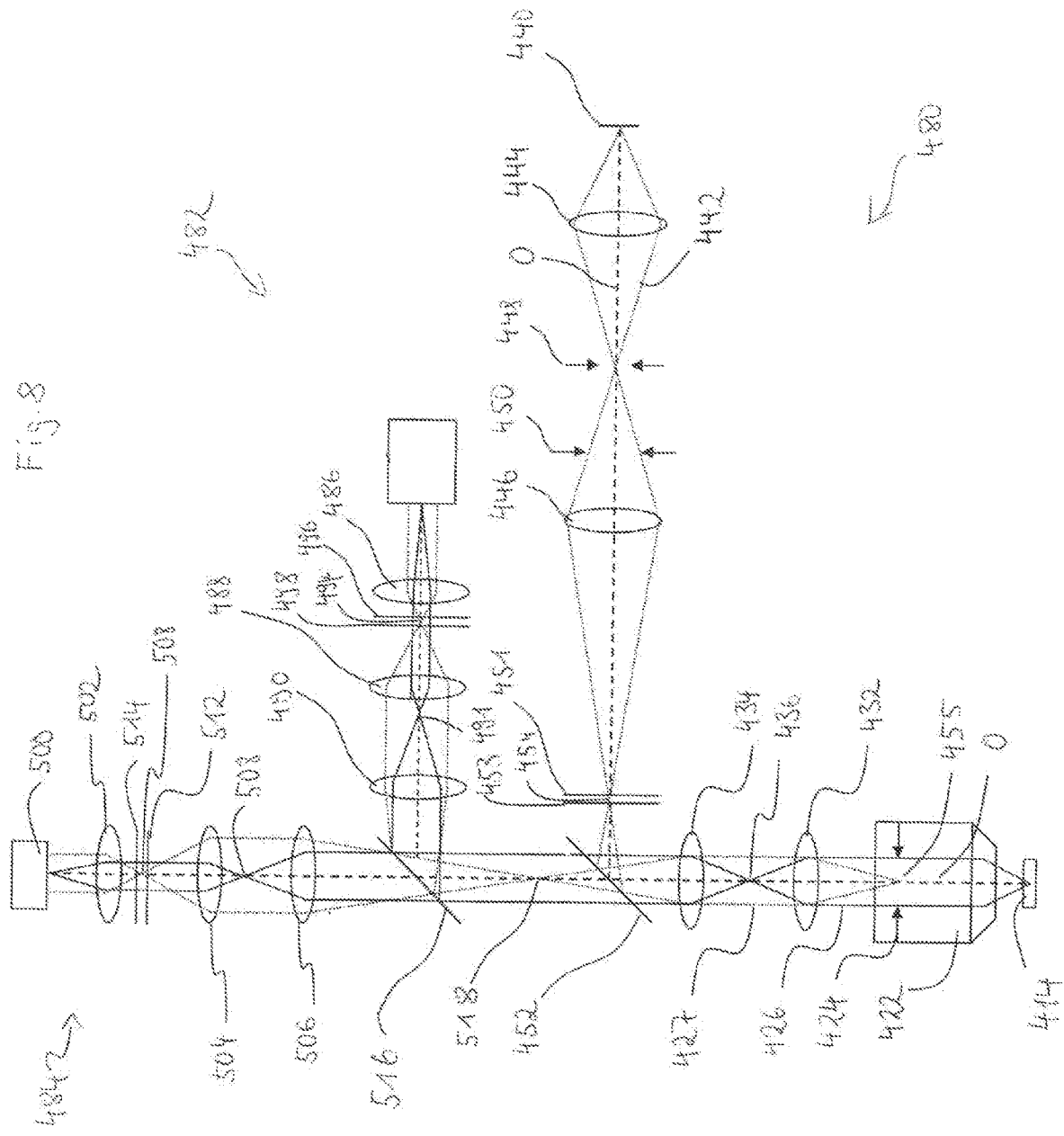
FIG. 8 shows a microscope according to the present invention in a further embodiment.

FIG. 8 shows a microscope 480 as a further exemplifying embodiment. This further exemplifying embodiment refers to the arrangement in FIG. 6, in which the detection unit is omitted.

Microscope 480 according to FIG. 8 has a first detection module 482 and a second detection module 484. First detection module 482 contains a lens arrangement made up of three lenses 486, 488, and 490, an image 494 of objective pupil 424 being generated between the two lenses 486 and 488, while an intermediate image 491 of sample 414 is generated between lenses 488 and 490. Two spectrally selective components, in the form of a long-pass filter 496 and a short-pass filter 498, are present at the site of pupil image 494.

Second detection module 484 has a detector 500 and a lens arrangement made up of three lenses 502, 504, and 506. An image 508 of objective pupil 424 is generated between lenses 502 and 504. An intermediate image 510 of sample 414 is generated, on the other hand, between the two lenses 504 and 506. Two spectrally selective components, in the form of a long-pass filter 512 and a short-pass filter 514, are present at the location of pupil image 508.

Microscope 480 moreover contains a further spectrally selective component in the form of a beam splitter 516, which delivers a first spectral component of the detected light passing through objective 422 to first detection module 482 by reflection, and delivers a second spectral component, different therefrom, of detected light 452 to second detection module 484 by transmission. Reference character 427 in FIG. 8 furthermore designates the illumination beam path and at the same time the pupil imaging beam path.

In microscope 480, the two beam splitters 452 and 516 are each arranged at a distance respectively in front of and behind a pupil image 518. This distance is once again preferably defined in accordance with equation (7).

Figure 9:
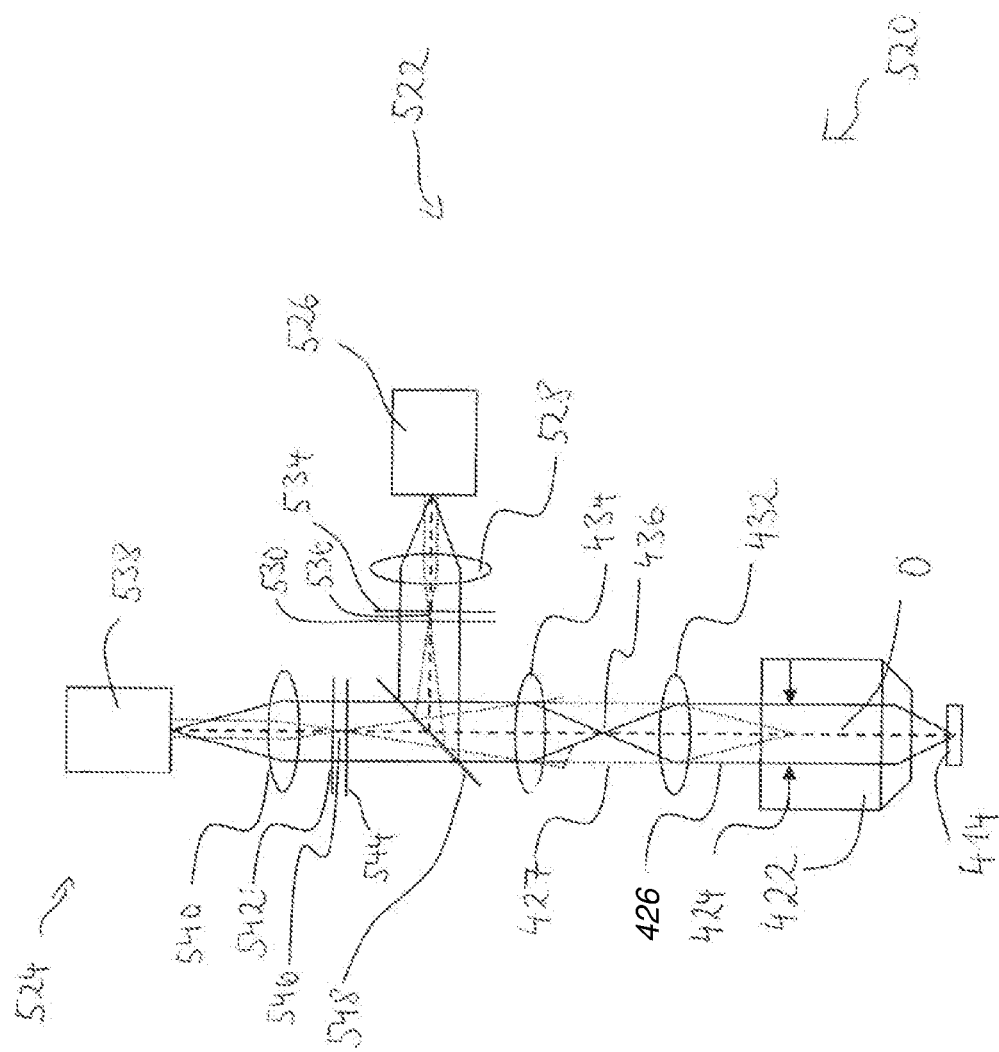
FIG. 9 shows a microscope according to the present invention in a further embodiment.

FIG. 9 shows a microscope 520 as a further exemplifying embodiment, the illumination beam path being omitted in FIG. 9. As in the arrangement depicted in FIG. 6, said beam path can be coupled, in the form of an incident illumination, into a beam path used in shared fashion for illumination and detection. The illumination beam path can also be coupled differently into microscope 520, however, for example in the manner of a transmitted light microscope, a light sheet microscope, or a laser scanning microscope.

Microscope 520 according to FIG. 9 has a first detector module 522 and a second detector module 524. First detector module 522 contains a detector 526, a lens 528, and two spectrally selective components in the form of a long-pass filter 530 and a short-pass filter 534. The two filters 530, 534 are arranged at the site of a pupil image 536.

Second detector module 524 contains a detector 538, a lens 540, and two spectrally selective components in the form of a long-pass filter 542 and a short-pass filter 544. The two filters 542 and 544 are arranged at the site of a pupil image.

Located in detection beam path 452 of microscope 520 is a further spectrally selective component in the form of a beam splitter 548, which delivers a first spectral component of the detected light to detector module 522 by reflection, and a spectral component different therefrom to detector module 524 by transmission.

In the arrangement according to FIG. 9, beam splitter 548 is located particularly advantageously upstream (in light terms) from pupil images 534 and 546 in which filter pairs 530, 532 and 542, 544 are arranged. This makes possible a particularly compact configuration, since no further pupil imaging is necessary.

Figure 10:
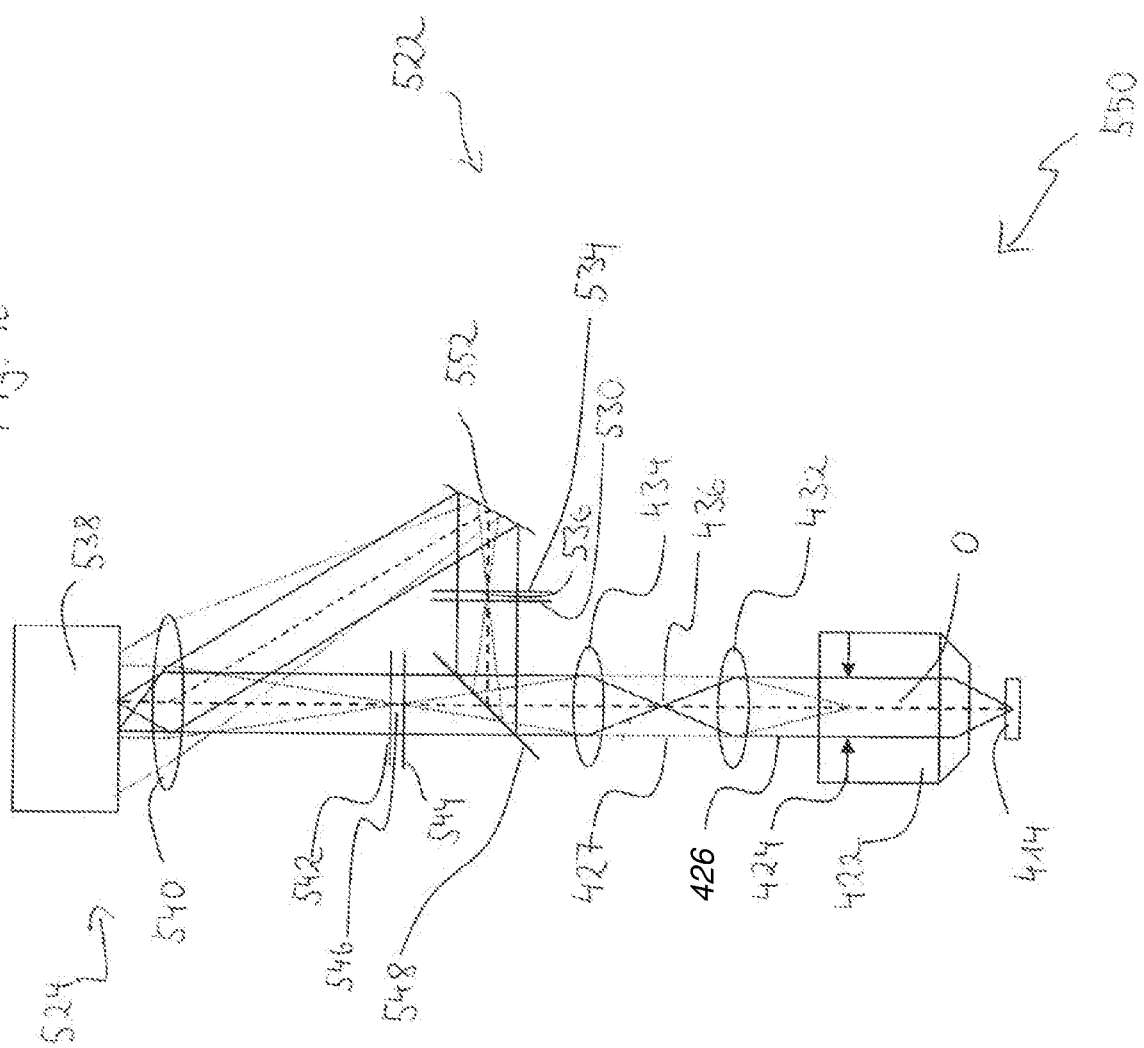
FIG. 10 shows a microscope according to the present invention in a further embodiment.

FIG. 10 shows a microscope 550 constituting a further exemplifying embodiment, this exemplifying embodiment referring to the arrangement according to FIG. 9.

Unlike in the arrangement depicted in FIG. 9, first detector module 522 of microscope 550 does not have its own detector. First detector module 522 has for this purpose a deflection mirror 552 that directs the spectral component of the detected light reflected from beam splitter 548 to detector 538 of second detector module 524. Detector 538 possesses two separate detector segments that are configured to capture, separately from one another, the components of the detected light spectrally separated from one another by beam splitter 548.

Figure 11:
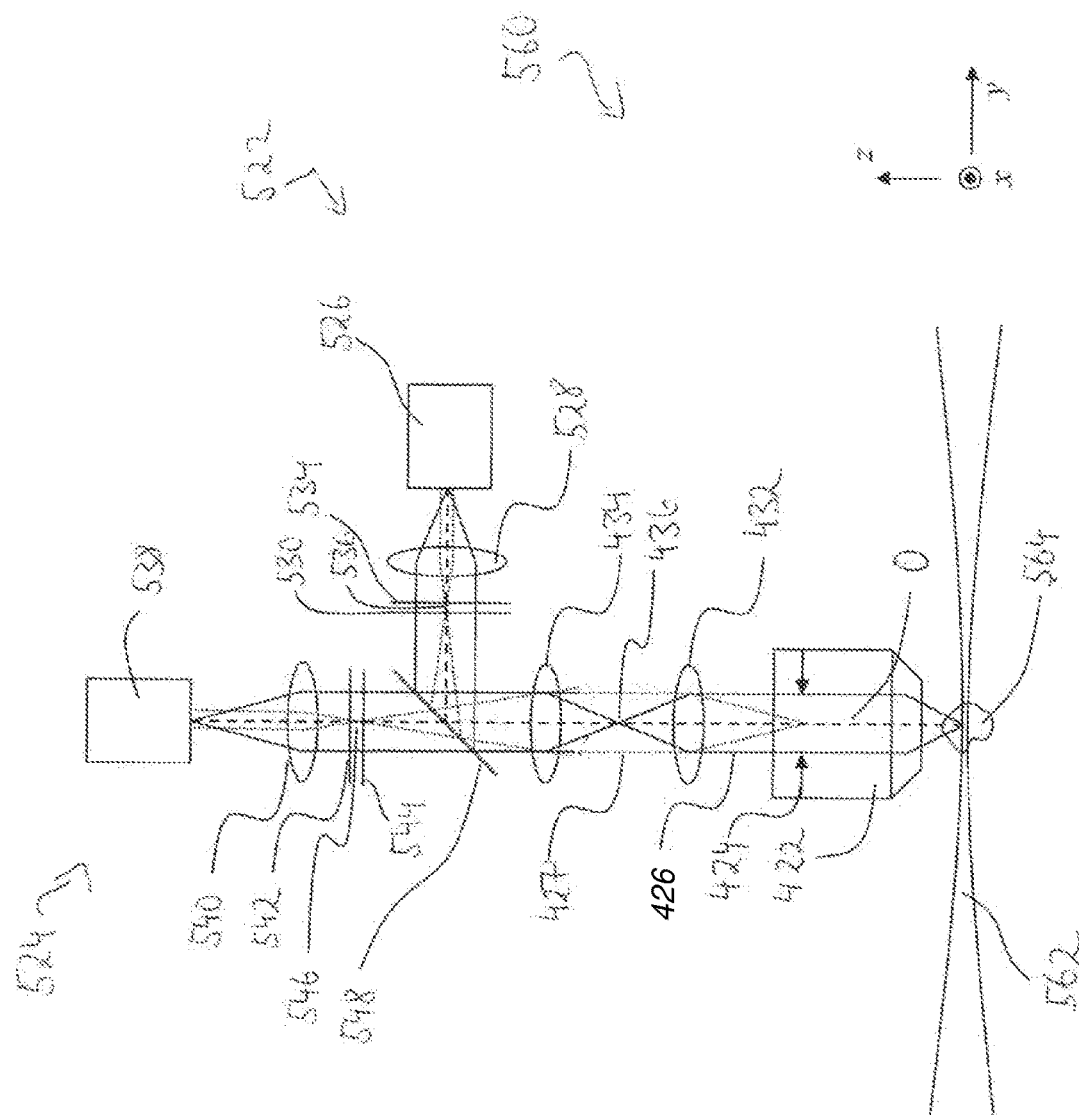
FIG. 11 shows a microscope according to the present invention in a further embodiment.

FIG. 11 shows a microscope 560 that refers to the arrangement according to FIG. 9. FIG. 11 shows, in particular, an example of a possible sample illumination, namely utilizing a so-called light sheet 562. This light sheet 562 represents an illuminating light distribution that illuminates only a thin layer inside a sample 564. In the exemplifying embodiment according to FIG. 11, light sheet 562 is introduced in a y direction with reference to the x-y-z coordinate system depicted therein, i.e. perpendicularly to optical axis O of the detection beam path which is oriented in a z direction.

Figure 12:
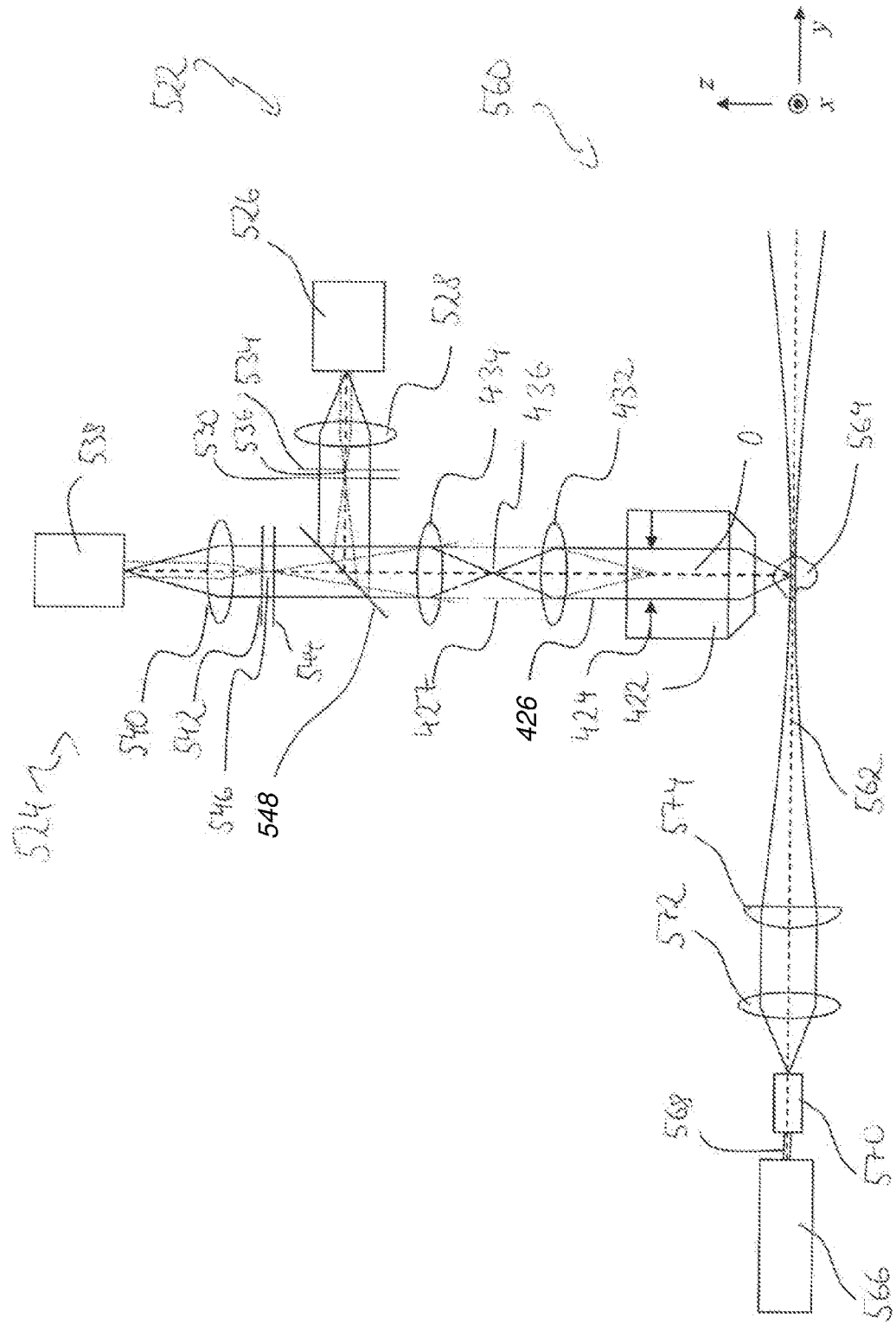
FIG. 12 shows a microscope according to the present invention in a further embodiment.

FIG. 12 shows, by way of example, how light sheet 562 can be generated in a concrete technical implementation. The embodiment according to FIG. 12 contains a laser light source 566 that emits an illuminating light beam 568. Illuminating light beam 568 then passes through a beam spreader 570, a collimator lens 572, and a cylindrical lens 574 that focuses illuminating light beam 568 only in the direction of the z axis but not in the direction of the x axis.

Further exemplifying embodiments in which the optical device according to the present invention is a scanning microscope, in which the light propagating in a detection beam path executes a scanning motion, will be described below with reference to FIGS. 13 to 21.

Figure 13:
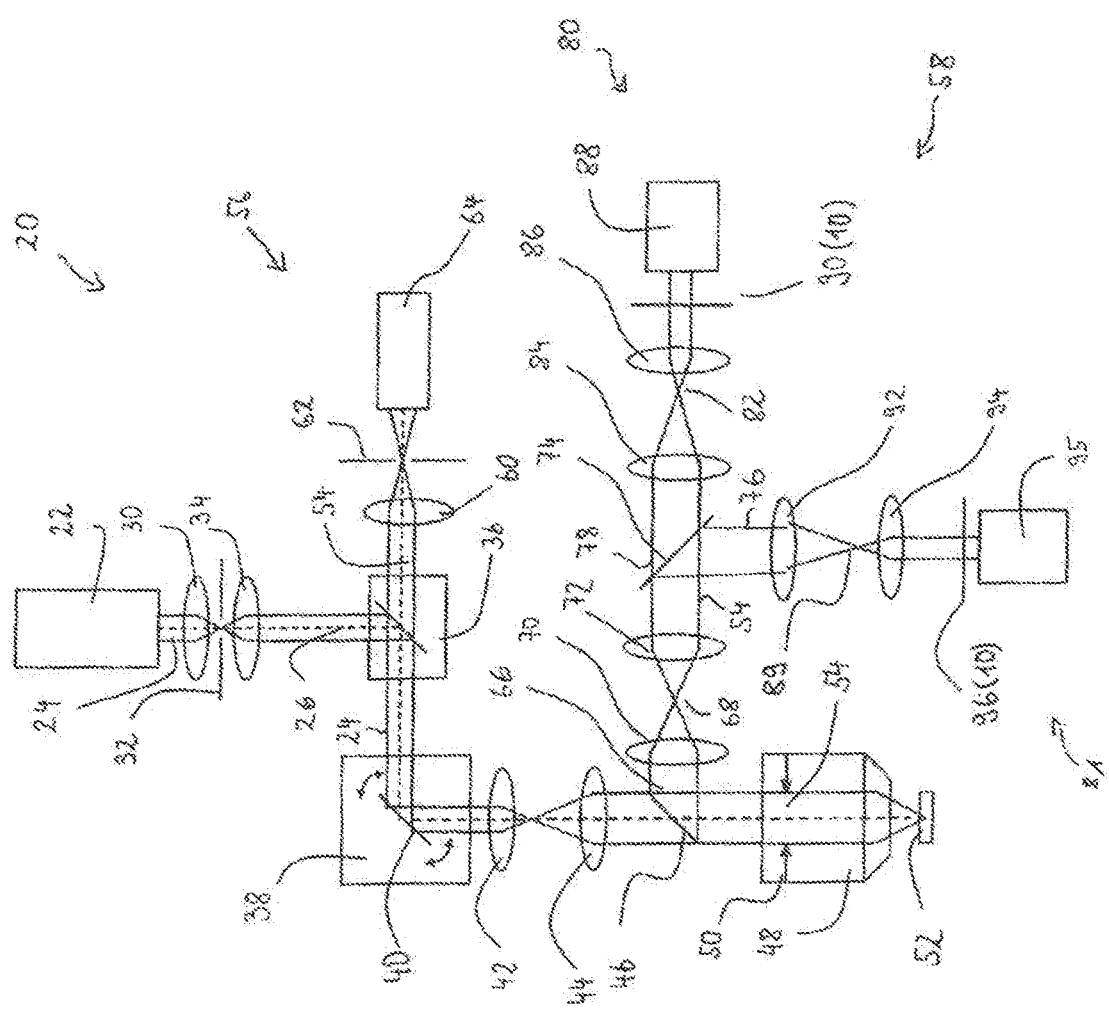
FIG. 13 shows a microscope according to the present invention in a further embodiment.

FIG. 13 shows, purely schematically, a scanning microscope 20 according to the present invention which contains an excitation light source 22 that emits an illuminating light bundle 24 along an illumination beam path 26. Illuminating light bundle 24 is focused by a lens 30 onto an excitation pinhole 32. After passage through excitation pinhole 32, a further lens 34 directs illuminating light bundle 24 onto a beam splitter 36 that deflects illuminating light bundle 24 onto a scanning unit 38 which contains one or more movable scanning mirrors 40. Illuminating light bundle 24, deflected into a scanning motion with the aid of scanning unit 38, is incident through a scanning optic 42 and further lens 44 onto a beam splitter 46. After passing through beam splitter 46, illuminating light bundle 24 travels into an objective 48 that comprises an objective pupil 50. Lastly, objective 48 focuses illuminating light bundle 24 onto a sample 52.

Illuminating light bundle 24 is deflected with the aid of scanning unit 38 in such a way that the illuminating light bundle that has passed through objective 48 executes a scanning motion on sample 52. Fluorescent radiation is thereby generated in sample 52 by illuminating light bundle 24, said radiation being directed in the form of a detected light bundle 54 through objective 48 back into scanning microscope 20.

In the embodiment according to FIG. 13, detected light bundle 54 is delivered to two separate detection units labeled generally 56 and 58 in FIG. 13. Detection unit 56 receives detected light bundle 54 after the latter has been delivered back onto scanning unit 38. Detection unit 56 thus constitutes a "descanned" unit. Detection unit 58, on the other hand, receives detected light bundle 54 without the latter having been influenced by scanning unit 38. Detection unit 58 therefore represents a "non-descanned" unit.

Descanned detection unit 56 contains a lens 60 that focuses detected light bundle 54 onto a detection pinhole 62 after said bundle has been deflected by scanning unit 38 and directed through beam splitter 36. Arranged behind detection pinhole 62 is a detector 64 that receives illuminating light bundle 54. Be it noted at this juncture that beam splitter 46, for example, is pivotable out of the beam path or partly transmissive for the fluorescent radiation.

A detection beam path 66 branched off from illuminating beam path 26 by beam splitter 46 is present in non-descanned detection unit 58. Non-descanned detection unit 58 contains a respective lens 70 and 72 on either side of an intermediate image plane 68 in which an intermediate image of sample 52 is generated. Arranged behind lens 72 in detection beam path 66 is a beam splitter 74 that constitutes a spectrally selective component according to the present invention. Beam splitter 74 splits detected light bundle 54 into two sub-bundles 76 and 78 that are delivered to two separate detection modules labeled generally 80 and 81 in FIG. 2.

Detection module 80 comprises a lens 84 and a lens 86 respectively on either side of an intermediate image plane 82 in which an intermediate image of sample 52 is generated. Lens 86 directs detected light bundle 54 onto a detector 88 in front of which a detection filter 90 is arranged.

Detection module 81 correspondingly comprises a lens 92 and a lens 94 respectively on either side of an intermediate image plane 89 in which an intermediate image of sample 52 is also generated. Lens 94 directs detected light bundle 54 onto a detector 95. A detection filter 90 is arranged in front of detector 95.

Be it noted that in the arrangement according to FIG. 13, beam splitters 36, 46, and 74 are each embodied dichroically, and respectively reflect the light incident onto them or allow it to pass, depending on wavelength. Beam splitter 36 thus has the property of reflecting light in the wavelength region of illuminating light bundle 24, and allowing light in the wavelength region of detected light bundle 54 to pass. Beam splitter 46 correspondingly reflects light in the wavelength region of detected light bundle 54, while it allows light in the wavelength region of illuminating light bundle 24 to pass. Beam splitter 74 in turn allows a portion of detected light bundle 54 to pass, while it reflects the remaining portion.

Be it noted furthermore that in the depiction of FIG. 13, illuminating light bundle 24 and detected light bundle 54 are partly overlaid on one another. The beam path between beam splitter 46 and sample 52 thus constitutes, in a way, a shared beam path for both light bundles 24 and 54.

In the specific embodiment according to FIG. 13, detection filters 90 and 96 each constitute a spectrally selective component of the kind shown in FIG. 1. The reference character 10, which designates the spectrally selective component in FIG. 1, is accordingly added respectively in parentheses after detection filters 90 and 96 in FIG. 13.

In the specific embodiment according to FIG. 13, detection filters 90 and 96 are arranged inside detection beam path 66 in such a way that they are each present at the site of an image of objective pupil 50. This arrangement of detection filters 90 and 96 has the advantage that the light incidence site on effective surface 12 of the respective detection filter 90 and 96 remains constant. No edge location shift dependent on the site of the light incidence therefore occurs.

In particular for the case in which the scanning motion of illuminating light bundle 24 generated by scanning unit 38, and thus the corresponding tilting motion of detected light bundle 54 at the site of the pupil image, are comparatively small, the result is also only a small angle-dependent shift of the spectral edge. The embodiment according to FIG. 13 thus represents an advantageous solution for scanning angles that are not too large.

Figure 14:
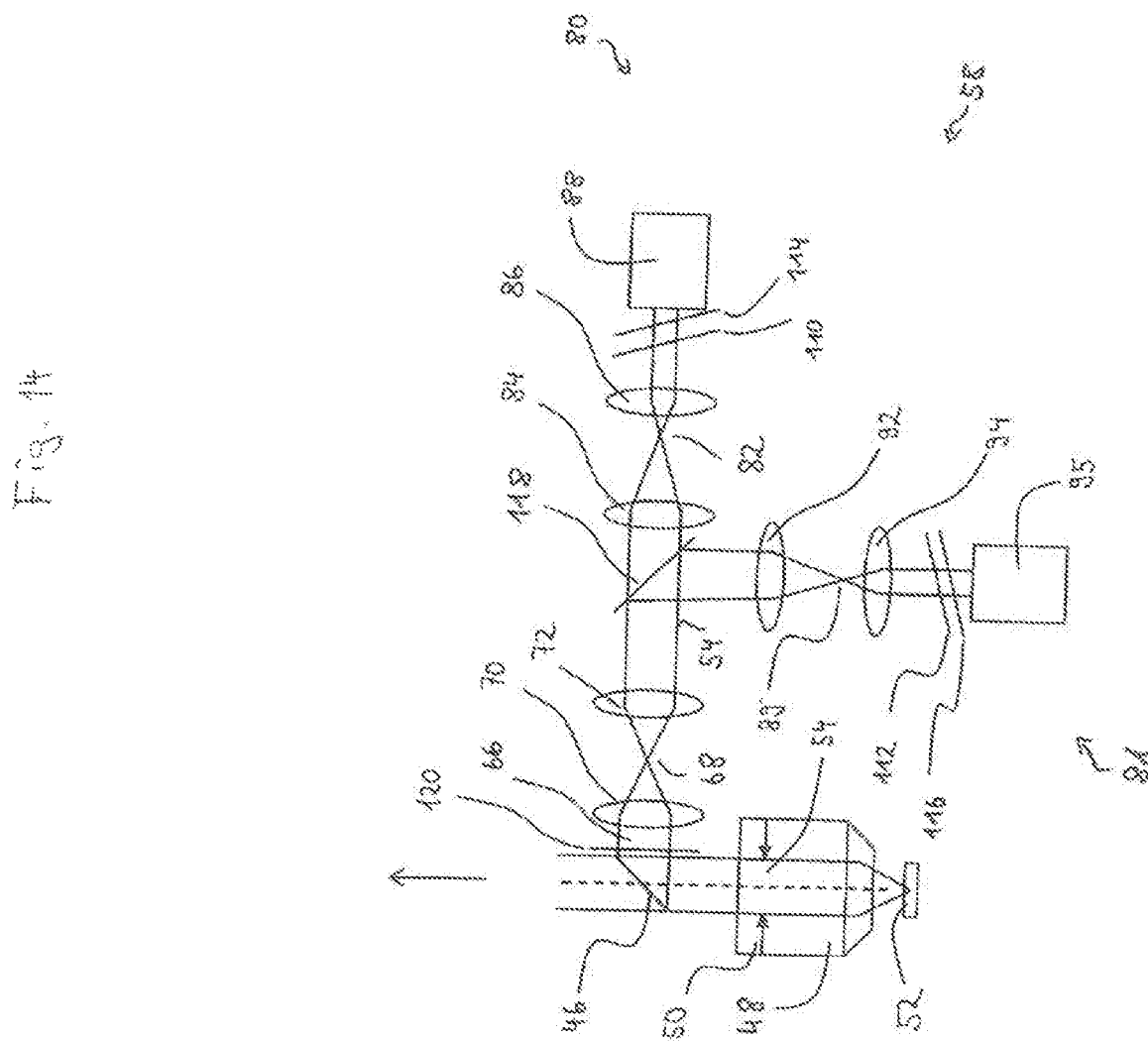
FIG. 14 shows a microscope according to the present invention in a further embodiment.
Figure 15:
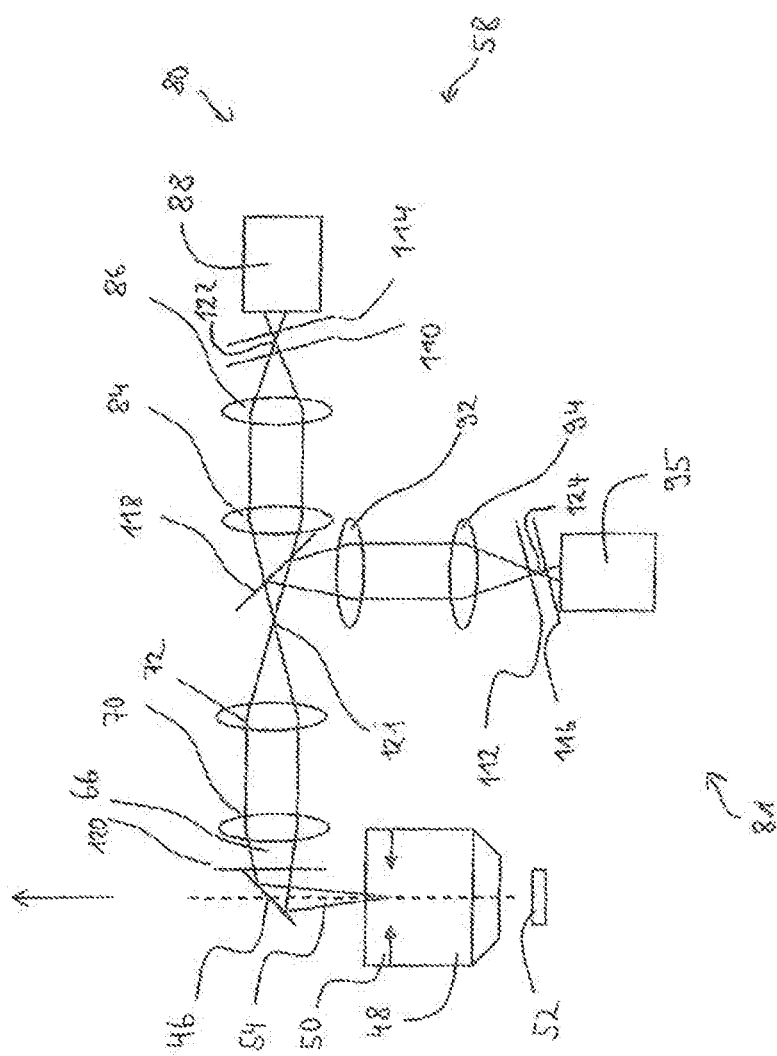
FIG. 15 shows the pupil imaging beam path for the embodiment shown in FIG. 14.

FIGS. 14 and 15 show a variant embodiment of scanning microscope 20 depicted in FIG. 13, in which a compensation for the angle-dependent edge location shift is applied by way of an opposite-direction edge location shift that is caused by a variation of the light incidence site on spectrally selective component 10. In FIGS. 14 and 15, those components which correspond to the components used in the embodiment according to FIG. 13 are labeled with the reference characters already used in FIG. 13. FIG. 14 furthermore depicts only those components which are part of non-descanned detection unit 58 or interact directly therewith. The same is true for all further exemplifying embodiments that are described below with reference to FIGS. 15 to 21.

Unlike in the embodiment according to FIG. 13, the embodiment depicted in FIG. 14 contains, in front of the two detectors 88 and 95, a respective filter pair that is made up of a respective long-pass filter 110 and 112 and a respective short-pass filter 114 and 116. The two filter pairs thus each constitute a band-pass filter having two spectral edges which can be variably adjusted independently of one another. Each of filters 110, 112, 114, and 116 is set obliquely as depicted in FIGS. 2 and 3, in order to achieve the desired monotonic edge location shift as a function of incidence angle.

The arrangement according to FIG. 14 furthermore contains a beam splitter 118 that, like filters 110, 112, 114, and 116, represents a spectrally selective component of the kind shown in FIG. 1. Beam splitter 118 is arranged with its effective surface at an angle of 45° with respect to the optical axis of detection beam path 66.

The arrangement according to FIG. 14 moreover additionally comprises a blocking filter 120 that is arranged in detection beam path 66 in front of lens 70. Blocking filter 120 serves to block excitation light, reflected at sample 52, whose intensity is several times greater than the intensity of the detected fluorescent light.

FIG. 15 shows the pupil imaging beam path that is pertinent to the arrangement according to FIG. 14. Those sites within detection beam path 66 at which a respective image of objective pupil 50 is located are evident in the depiction according to FIG. 15, and are labeled 121, 122, and 124 in FIG. 15. Beam splitter 118 is arranged behind site 121 of the pupil image at a distance that is predetermined in accordance with equation (7) indicated above. The same is true for the filter pair made up of filters 110 and 114, and for the filter pair made up of filters 112 and 116, filters 110, 112 each being arranged in front of the site of the pupil image, and filters 114, 116 each being arranged behind the site of the pupil image. The distances of filters 110 and 114 from the site of the pupil image are the same in terms of magnitude. The same is true of filter pair 112, 116.

Figure 16:
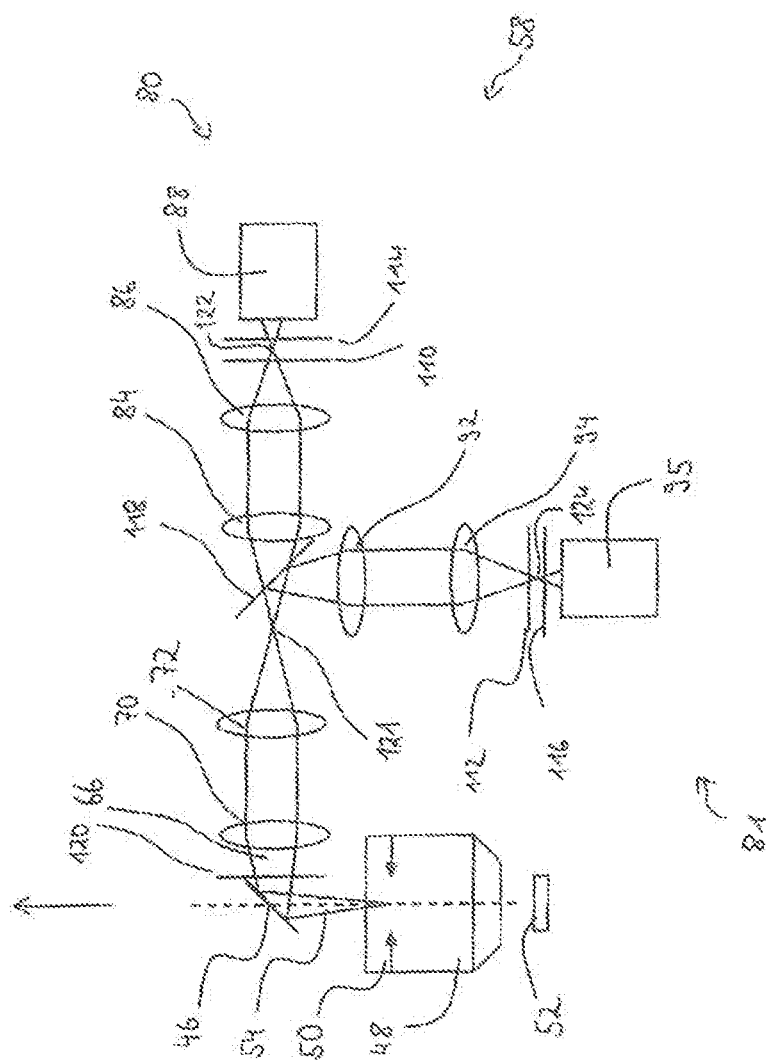
FIG. 16 shows the microscope according to the present invention in a further embodiment.

FIG. 16 is a depiction, corresponding to FIG. 15, of pupil imaging for a variant embodiment in which filters 110, 112, 114, and 116 are not set obliquely but instead are aligned at right angles to the optical axis of detection beam path 66. In this embodiment, unlike in the purely schematic depiction according to FIG. 16, filters 110, 112, 114, and 116 are correspondingly arranged practically at the respective site of the pupil image.

Figure 17:
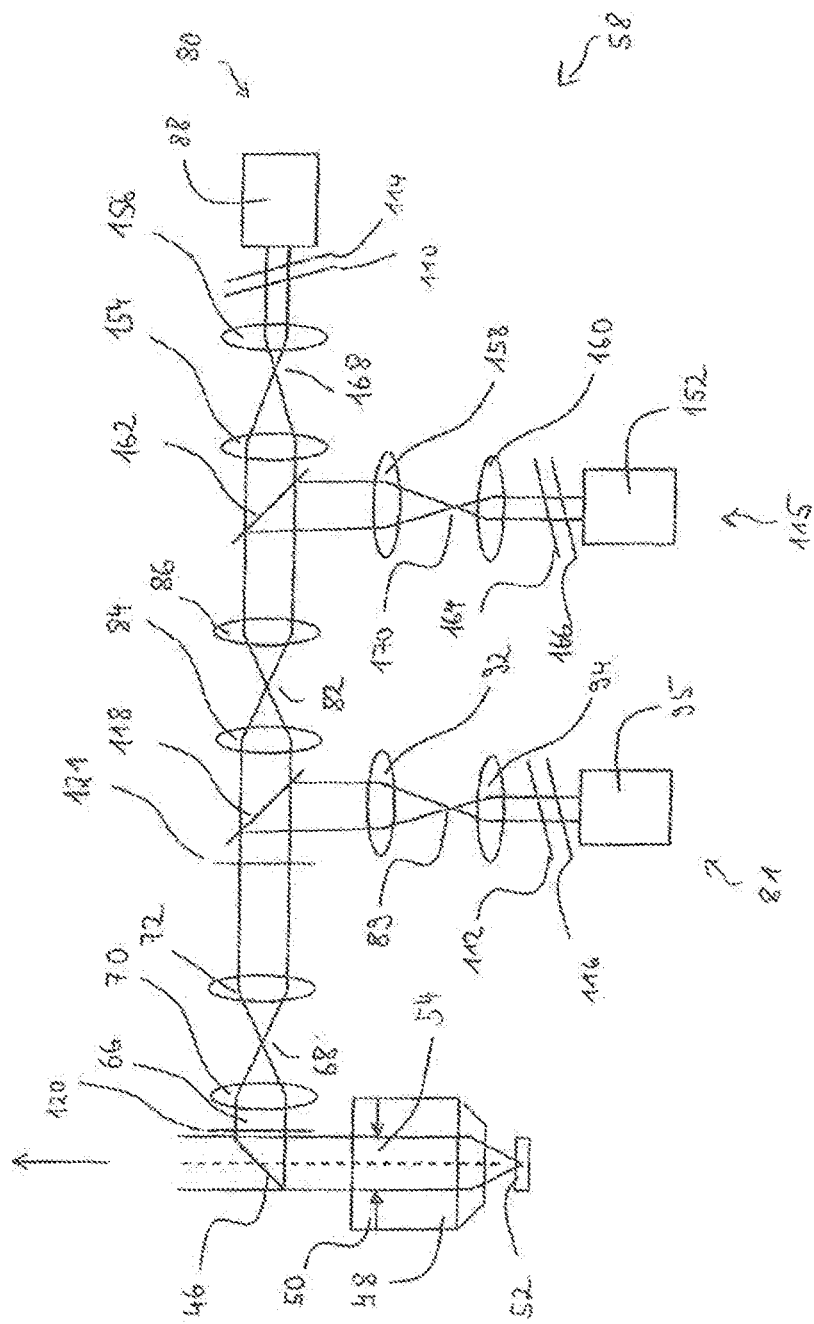
FIG. 17 shows the microscope according to the present invention in a further embodiment.
Figure 18:
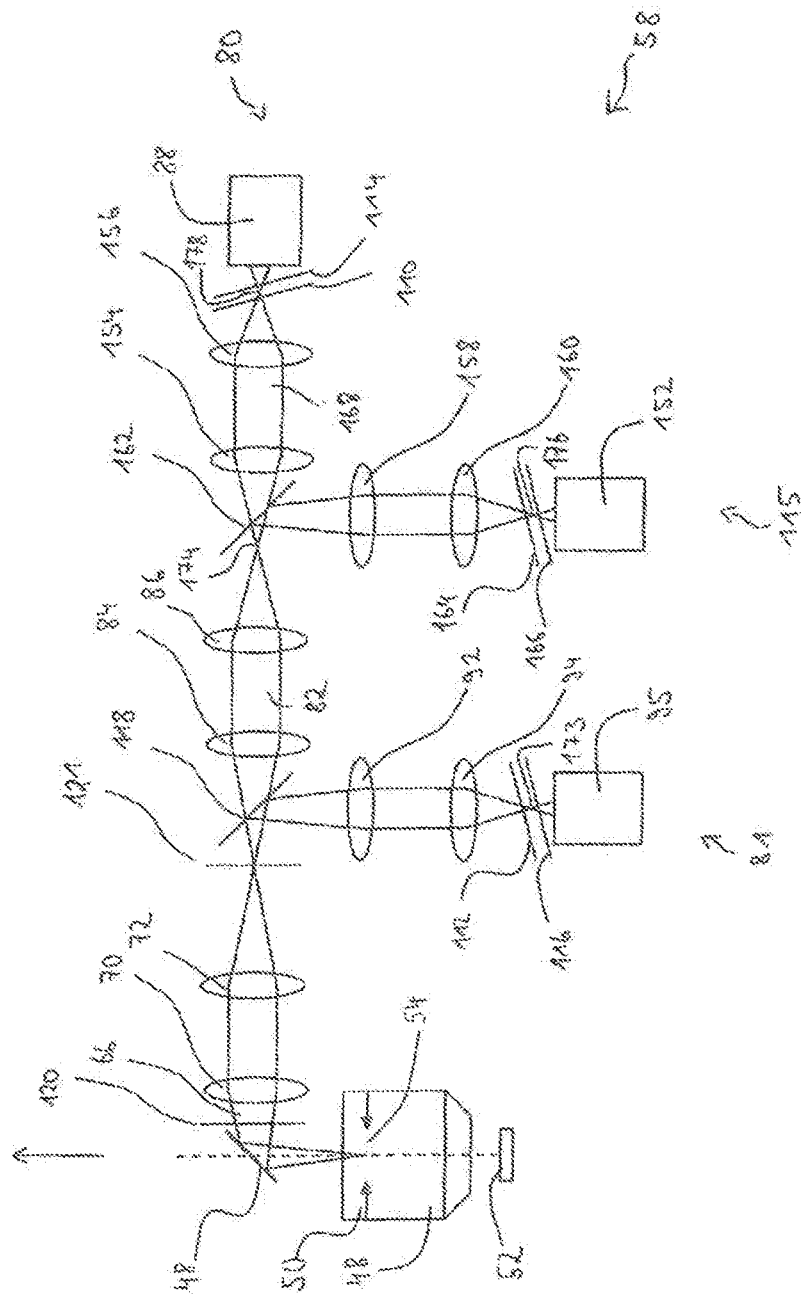
FIG. 18 shows the pupil imaging beam path for the embodiment shown in FIG. 17.

FIGS. 17 and 18 show a further embodiment that, as compared with the embodiment according to FIGS. 14 and 15, contains a further detection module 115 having an additional detector 152. Further lenses 154, 156, 158, and 160 are accordingly provided in detection beam path 66. Detection beam path 66 furthermore contains a further beam splitter 162 as well as a long-pass filter 164 and a short-pass filter 166, which are arranged in front of detector 152 and in combination constitute a band-pass filter. The additional intermediate image planes in which a respective intermediate image of sample 52 is generated are labeled 168 and 170 in FIG. 17. Also evident from the depiction of pupil imaging according to FIG. 18 are additional sites 173, 174, 176, and 178 of a pupil image.

Figure 19:
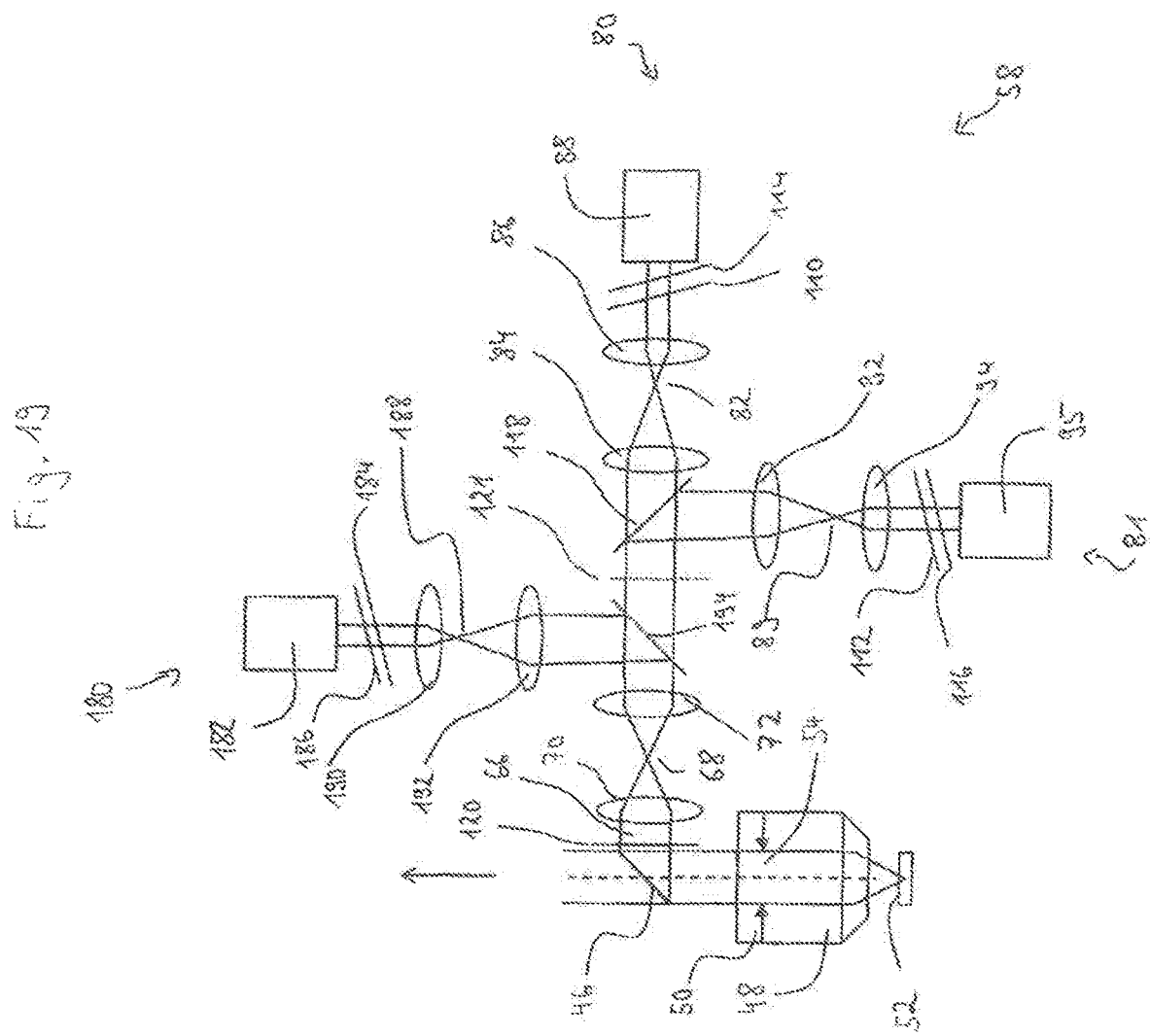
FIG. 19 shows the microscope according to the present invention in a further embodiment.

FIG. 19 shows an embodiment, modified with respect to the arrangement depicted in FIGS. 17 and 18, in which detection module 115 is replaced by a detection module 180. Detection module 180 contains a detector 182 in front of which are arranged a long-pass filter 184 and a short-pass filter 186 which in combination constitute a band-pass filter. Detection module 180 furthermore contains two respective further lenses 190 and 192 on either side of an intermediate image plane 188 in which an image of sample 52 is generated.

In addition to beam splitter 118, in this embodiment detection beam path 66 contains a further beam splitter 194 of the kind depicted in FIG. 1. The two beam splitters 118 and 194 are arranged respectively in front of and behind site 121 of the pupil image, at the same distance which is defined according to equation (7). This makes possible a particularly compact configuration, since the number of optical elements can be reduced as compared with the embodiment according to FIGS. 17 and 18.

FIG. 20 shows a further embodiment of scanning microscope 20 which refers to the configuration according to FIG. 19.

The embodiment according to FIG. 20 contains non-descanned detection unit 58 which encompasses a total of four detection modules, namely detection module 80 as well as three further detection modules 210, 221, and 228. Detected light bundle 54, spectrally separated by means of a beam splitter cascade, is delivered to detection modules 80, 210, 221, and 228 in a manner described below. This beam splitter cascade is made up of beam splitter 118 as well as further beam splitters 203 and 214. The spectrally selective beam splitters 118, 203, and 214 in detection beam path 66 are arranged with their respective effective surfaces at an angle of 45° with respect to the optical axis of detection beam path 66. Beam splitters 118, 203, and 214 are also each arranged behind the site of an image of objective pupil 50, at a distance that is predetermined in accordance with conditions (7).

The embodiment according to FIG. 20 takes into account the circumstance that beam splitters 118, 203, and 214 each reflect a larger spectral region of detected light bundle 54, with reference to the spectral edge, than they transmit. The embodiment according to FIG. 20 therefore provides for a cascading of detection modules 80, 210, 221, and 228 by reflection at beam splitters 118, 203, and 214. This embodiment further takes into account the circumstance that each of detection modules 80, 210, 221, and 228 can have delivered to it, at a maximum, only that spectral component of detected light bundle 54 which is not detected by the respective other detection modules. The embodiment according to FIG. 20 accordingly provides for cascading not only via beam splitter reflection but also via the wavelengths of the spectral components which are detected with detection modules 80, 210, 221, and 228. The cascading just mentioned is accomplished from the longest wavelength to shorter wavelengths.

Specifically, beam splitter 118 transmits into detection module 80 that spectral component of detected light bundle 54 which has the longest wavelengths within the detected light. This long-wave spectral component thus arrives at detector 88 after passing through lenses 84, 86 and the obliquely positioned filter pair made up of long-pass filter 110 and short-pass filter 114. The remaining spectral component of the detected light is reflected at beam splitter 118, through lenses 200, 202, onto beam splitter 203. Beam splitter 203 transmits into detection module 210 the spectral component that has the longest wavelengths within the detected light delivered to it. After passing through lenses 204, 206 and an obliquely positioned filter pair that is made up of a long-pass filter 207 and a short-pass filter 208, the spectral component of the detected light transmitted through beam splitter 203 arrives at a detector 209. The remaining spectral component of the detected light is delivered by beam splitter 203 by reflection, via lenses 211, 213, to beam splitter 214.

Beam splitter 214 transmits into detection module 221 the spectral component that has the longest wavelengths within the detected light delivered to it. After passing through lenses 215, 217 and an obliquely positioned filter pair that is made up of a long-pass filter 218 and a short-pass filter 219, this transmitted spectral component arrives at a detector 220. Beam splitter 214 reflects the remaining spectral component of the detected light delivered to it, so that this spectral component, after passing through lenses 222, 224 and an obliquely positioned filter pair that is made up of a long-pass filter 225 and a short-pass filter 226, arrives at a detector 227.

In the arrangement according to FIG. 20, the reference characters 201, 205, 212, 216, and 223 designate sites at which an intermediate image of sample 52 is generated.

The arrangement according to FIG. 20 thus provides that detected light bundle 54, on its path to detectors 88, 209, 220, and 227, experiences only exactly one transmission at each of beam splitters 118, 203, and 214. This is advantageous in terms of light yield, since the reflectance values of beam splitters 118, 203, and 214 are higher than their transmittance values.

FIG. 21 shows an embodiment in which beam splitter pairs 251, 252 and 254, 255 are provided, the beam splitters of which have different dispersions and thus are at different distances from a pupil image site labeled 253 in FIG. 21.

The embodiment according to FIG. 21 encompasses a total of five detection modules 286, 287, 288, 289, and 290. Each of these detection modules contains two lenses 263, 265, 269, 271, 256, 282, 275, 277, 257, 259 as well as an obliquely positioned filter pair that is made up of a long-pass filter 266, 272, 283, 278, 260 and a short-pass filter 267, 273, 284, 279, 261, and a detector 268, 274, 285, 280, 262.

As mentioned above, because of their different dispersions the two beam splitters 251, 252 can be arranged at different distances from location 251 of the pupil image. In a compact arrangement, several beam splitters can therefore be arranged in front of location 251 of the pupil image. The same applies to the location of the two beam splitters 254, 255 behind, these being located on the other side of location 251.

In conclusion, it should also be noted once again for the sake of completeness that in the detection arrangements described above, with the exception of beam splitter 46 and filter 120, all the beam splitters and filters, i.e. edge filters, long-pass filters, and short-pass filters, constitute spectrally selective components of the type according to the present invention.

FIGS. 22 and 23 show two exemplifying embodiments of the concrete technical implementation of the spectrally selective component according to the present invention.

In the exemplifying embodiment according to FIG. 22, the spectrally selective component is embodied as a multi-layer Fabry-Perot filter 700. Fabry-Perot filter 700 correspondingly encompasses a carrier substrate 702 on which a first reflection structure 704, a beveled or wedge-shaped space-filling layer 706, and a second reflection structure 708 set obliquely with respect to first reflection structure 704 are arranged, in that sequence viewed from carrier substrate, in a plane-parallel arrangement. First reflection structure 704 and second reflection structure 708 each have a multi-layer configuration in which dielectric layers of alternatingly different materials are stacked on one another. Two materials can be used, for example, one of which has a relatively high refractive index and the other a relatively low refractive index. In FIG. 22, two layers of different materials stacked directly on one another are respectively labeled 710 and 712.

FIG. 23 shows an exemplifying configuration of the spectrally selective component in the form of a multi-layer interference filter 800. Interference filter 800 encompasses a carrier substrate 802 and a stack of several beveled or wedge-shaped dielectric layers of alternatingly different materials.

Two of these layers are respectively labeled 804 and 806 in FIG. 23. The materials of these dielectric layers 804 and 806 are selected, for example, in such a way that one of these materials has a comparatively high refractive index and the other a comparatively low refractive index.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context and/or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical device, comprising:
an optical system; and
at least one spectrally selective component arranged in a beam path and configured to spectrally influence light that propagates along the beam path, the spectrally selective component comprising an effective surface having at least one spectral edge that monotonically varies with a variation of an incidence site of the light on the effective surface,
wherein:
the effective surface of the spectrally selective component is arranged in the beam path obliquely to an optical axis of the beam path at a point at which a monotonic variation of the spectral edge of the effective surface, which is caused by a variation of an incidence angle at which the light is incident onto the effective surface, is opposed to and compensated for, at least in part, by the monotonic variation of the spectral edge of the effective surface which is caused by the variation of the incidence site at which the light is incident onto the effective surface; or
the effective surface is arranged in the beam path perpendicular to the optical axis of the beam path at a site of an image of a pupil of the optical system, wherein a maximum angle of incidence at which the light strikes the effective surface, which occurs as a result of scanning movement of the light, is equal to or less than 35°, and wherein the incidence site of the light on the effective surface remains constant.

2. The optical device according to claim 1, further comprising a drive system configured to displace the spectrally selective component in the beam path in such a way that the incidence site of the light on the effective surface is adjustable.

3. The optical device according to claim 2, wherein the spectrally selective component is displaceable by the drive system along a variation axis along which the spectral edge of the effective surface varies.

4. The optical device according to claim 1, wherein the at least one spectrally selective component includes at least one edge filter.

5. The optical device according to claim 4, wherein the at least one edge filter includes at least one short-pass filter, at least one long-pass filter, and/or at least one band-pass filter.

6. The optical device according to claim 5, wherein the at least one edge filter includes the at least one band-pass filter which is made up of a short-pass filter and a long-pass filter which are arranged one behind another along the optical axis of the beam path.

7. The optical device according to claim 1, wherein the optical system is an objective.

8. An optical device for wide field microscopy, comprising:
an optical system; and
at least one spectrally selective component arranged in a beam path and configured to spectrally influence light that propagates along the beam path, the spectrally selective component comprising an effective surface having at least one spectral edge that monotonically varies with a variation of an incidence site of the light on the effective surface,
wherein:
the effective surface is arranged in the beam path perpendicular to the optical axis of the beam path at a site of an image of a pupil of the optical system, wherein a maximum angle of incidence at which the light strikes the effective surface, which occurs as a result of principal rays of light bundles coming from different object points that pass through different regions on the effective surface of the spectrally selective component for different field angles, is equal to or less than 35°, and wherein the incidence site of the light on the effective surface remains constant.

9. The optical device according to claim 8, wherein the optical device is a wide field microscope.

10. An optical device, comprising:
an optical system; and
at least one spectrally selective component arranged in a beam path and configured to spectrally influence light that propagates along the beam path for sample illumination, the spectrally selective component comprising an effective surface having at least one spectral edge that monotonically varies with a variation of an incidence site of the light on the effective surface,
wherein:
the effective surface of the spectrally selective component is arranged in the beam path obliquely to an optical axis of the beam path at a point at which a monotonic variation of the spectral edge of the effective surface, which is caused by a variation of an incidence angle at which the light is incident onto the effective surface, is opposed to and compensated for, at least in part, by the monotonic variation of the spectral edge of the effective surface which is caused by the variation of the incidence site at which the light is incident onto the effective surface; or
the effective surface is arranged in the beam path perpendicular to the optical axis of the beam path at a site of an image of a pupil of the optical system, wherein a maximum angle of incidence at which the light strikes the effective surface, which occurs as a result of scanning movement of the light, is equal to or less than 35°, and wherein the incidence site of the light on the effective surface remains constant.

11. An optical device, comprising:
an optical system; and
at least one spectrally selective component arranged in a beam path and configured to spectrally influence light that propagates along the beam path, the spectrally selective component being made up of a multi-layer structure that defines an effective surface having at least one spectral edge that monotonically varies with a variation of an incidence site of the light on the effective surface,
wherein:
the effective surface of the spectrally selective component is arranged in the beam path obliquely to an optical axis of the beam path at a point at which a monotonic variation of the spectral edge of the effective surface, which is caused by a variation of an incidence angle at which the light is incident onto the effective surface, is opposed to and compensated for, at least in part, by the monotonic variation of the spectral edge of the effective surface which is caused by the variation of the incidence site at which the light is incident onto the effective surface; or
the effective surface of the spectrally selective component is arranged in the beam path perpendicular to the optical axis of the beam path at a site of an image of a pupil of the optical system, wherein a maximum angle of incidence at which the light strikes the effective surface, which occurs as a result of scanning movement of the light, is equal to or less than 35°, and wherein the incidence site of the light on the effective surface remains constant.

12. The optical device according to claim 11, wherein the multi-layer structure constitutes a Fabry-Perot arrangement.

13. An optical device, comprising:
an optical system; and
at least one beam splitter configured to combine an illumination beam path and a detection beam path into one shared beam path in which the optical system is arranged, the beam splitter being a spectrally selective component configured to spectrally influence light that propagates along the illumination beam path and along the detection beam path, the spectrally selective component comprising at least one effective surface having at least one spectral edge that monotonically varies with a variation of an incidence site of the light on the effective surface,
wherein:
the effective surface of the spectrally selective component is arranged in the shared beam path obliquely to an optical axis of the beam path at a point at which a monotonic variation of the spectral edge of the effective surface, which is caused by a variation of an incidence angle at which the light is incident onto the effective surface, is opposed to and compensated for, at least in part by the monotonic variation of the spectral edge of the effective surface which is caused by the variation of the site at which the light is incident onto the effective surface.

14. The optical device according to claim 13, further comprising at least a first and a second detection module, the beam splitter being configured to deliver the light, in spectrally separated fashion, by reflection to the first detection module and by transmission to the second detection module.

15. The optical device according to claim 14, further comprising a detector used in shared fashion by the two detection modules and having two detector segments of which one captures the light reflected by the beam splitter and the other one captures the light transmitted through the beam splitter.

16. The optical device according to claim 13, wherein the at least one spectrally selective component includes at least two beam splitters, one of which is arranged in the beam path in front of the image of the pupil and the other is arranged behind the image of the pupil.

17. The optical device according to claim 16, further comprising at least first, second and third detection modules, the at least two beam splitters constituting a beam splitter cascade with first and second beam splitters, the first beam splitter being configured to deliver the light in spectrally separated fashion by transmission to the first detection module and by reflection to the second beam splitter of the beam splitter cascade, which is configured to then deliver the light reflected by the first beam splitter by transmission to the second module and by reflection, directly or indirectly via a further beam splitter, to the third detection module.

18. The optical device according to claim 13, wherein the at least one spectrally selective component includes at least two beam splitters that are each arranged in the beam path in front or behind of the image of the pupil.

19. An optical device, comprising:
an optical system; and
at least one spectrally selective component arranged in a beam path and configured to spectrally influence light that propagates along the beam path, the spectrally selective component comprising at least one effective surface having a spectral edge that monotonically varies with a variation of an incidence site of the light on the effective surface,
wherein:
the effective surface of the spectrally selective component is arranged in the beam path obliquely to an optical axis of the beam path at a point at which a monotonic variation of the spectral edge of the effective surface, which is caused by a variation of an incidence angle at which the light is incident onto the effective surface, is opposed to and compensated for, at least in part, by the monotonic variation of the spectral edge of the effective surface which is caused by the variation of the incidence site at which the light is incident onto the effective surface.

20. The optical device according to claim 19, wherein the beam path is not a non-descanned detection beam path of a microscope, and wherein the effective surface of the spectrally selective component is arranged in the beam path in such a way that a surface normal line of the effective surface is inclined at a predetermined angle with respect to the optical axis of the beam path, and wherein the effective surface is at a distance along the optical axis of the beam path, with respect to the site of the image of the pupil, which is predetermined as a function of the variation of the incidence angle of the light.

21. The optical device according to claim 20, wherein the distance is predetermined in such a way that the following condition is met:

$$z \leq -2 \cdot \frac{D_E}{D_L} \cdot \vartheta \cdot \frac{\sin(90° + \varphi_0 - \vartheta)}{\sin(\vartheta)},$$

in which:
z designates the distance;
$D_E$ designates an incidence dispersion that indicates the variation in the spectral edge as a function of the incidence angle at which the light is incident onto the effective surface;
$D_L$ designates a longitudinal dispersion that indicates the variation in the spectral edge as a function of the incidence site at which the light is incident onto the effective surface;
$\vartheta$ indicates an angle, not equal to zero, between a principal ray of the light and the optical axis of the beam path at the site of the image of the pupil; and
$\varphi_0$ indicates the predetermined angle at which the surface normal line to the effective surface is inclined with respect to the optical axis of the beam path.

22. The optical device according to claim 20, wherein the predetermined angle at which the surface normal line to the effective surface is inclined with respect to the optical axis of the beam path is less than or equal to 65°.

23. The optical device according to claim 20, wherein the beam path in which the at least one spectrally selective component is arranged is made up of an illumination beam path or a detection beam path, or of a beam path segment shared by the illumination beam path and the detection beam path.

* * * * *